United States Patent
Jiang et al.

(10) Patent No.: US 7,752,332 B2
(45) Date of Patent: Jul. 6, 2010

(54) GEOMETRIC ROUTING IN WIRELESS NETWORKS

(75) Inventors: Anxiao Jiang, College Station, TX (US); Jie Gao, Stoney Brook, NY (US); Jehoshua Bruck, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 1017 days.

(21) Appl. No.: 11/379,196

(22) Filed: Apr. 18, 2006

(65) Prior Publication Data

US 2006/0259597 A1    Nov. 16, 2006

Related U.S. Application Data

(60) Provisional application No. 60/673,271, filed on Apr. 20, 2005.

(51) Int. Cl.
G06F 15/173 (2006.01)
(52) U.S. Cl. ...................................................... 709/238
(58) Field of Classification Search ................ 709/238, 709/239, 240, 241, 244; 455/452.2; 370/355, 370/356, 392, 395.31; 716/12, 13, 14
See application file for complete search history.

(56) References Cited

U.S. PATENT DOCUMENTS

| | | | | |
|---|---|---|---|---|
| 6,067,572 | A * | 5/2000 | Jensen et al. | 709/241 |
| 6,125,279 | A * | 9/2000 | Hyziak et al. | 455/445 |
| 2005/0076137 | A1 * | 4/2005 | Tang et al. | 709/238 |

OTHER PUBLICATIONS

"Poster Abstract: Serial Data Aggregation Using Space-filling Curves in Wireless Sensor Networks" ACM Nov. 2003 Swapnil Patil.*
"Locating and Bypassing Routing Holes in Sensor Networks" IEEE Mar. 2004 Qing Fang.*
"Geographic Routing without Location Information" ACM Sep. 2003 Ananth Rao.*
"GPSR: Greedy Perimeter Stateless Routing for Wireless Networks" ACM 2000 Brad Karp.*
"Neighborhood-Based Topology Recognition in Sensor Networks" S. P. Fekete ACM May 2004.*

(Continued)

*Primary Examiner*—Wing F Chan
*Assistant Examiner*—Jonathan Willis
(74) *Attorney, Agent, or Firm*—Townsend and Townsend and Crew LLP

(57) ABSTRACT

Routing in a wireless network of communication devices that are located within a network boundary moves network traffic from a first communication device to a second communication device. A geometric indicator of network connectivity is constructed that identifies a curve on which network nodes are located and a network location for each node of the wireless network is determined, so that the network location of a node p identifies a node on the geometric indicator curve that is closest to the node p and indicates connectivity from the node p to the closest node of the geometric indicator curve. A routing scheme is determined, to route in the wireless network from the first communication device to the second communication device based on the respective determined network locations for the first and second communication devices.

21 Claims, 22 Drawing Sheets

OTHER PUBLICATIONS

"A Probabilistic Roadmap Planner for Flexible Objects with a Workspace Medial-Axis-Based Sampling Approach," Leonidas J. Guibas IEEE 1999.*

Amenta, N. et al., "The power crust, unions of balls, and the medial axis transform", Comput. Geom. Theory Appl., 19:127-153 (2001).

Amenta, N. et al., "The crust and the β-skeleton: combinatorial curve reconstruction", Graphical Models and Image Processing, 60(2):125-135 (Mar. 1998), Article No. IP980465.

Attali, D. et al., "Stability and computation of medial axes—a state-of the art report", Mathematical Foundations of Scientific Visualization, Computer Graphics, and Massive Data Exploration, Springer-Verlag (2004).

Barrett, C.L. et al., "Parametric probabilistic sensor network routing", WSNA'03, Sep. 19, 2003, pp. 122-131, San Diego, California, USA.

Bernstein, M. et al., "Graph approximations to geodesics on embedded manifolds", Technical report, Department of Psychology, Stanford University, Dec. 20, 2000.

Blum, H. et al., "A transformation for extracting new descriptors of shape", W. Wathen-Dunn, editor, Models for the Perception of Speech and Visual Form, pp. 362-380, MIT Press (1967), Data Sciences Laboratory, Air Force Cambridge Research Laboratories, Bedford, Massachusetts, USA.

Bose, P. et al., "Routing with guaranteed delivery in ad hoc wireless networks", 3rd Int. Workshop on Discrete Algorithms and methods for mobile computing and communications (DialM '99) (1999) pp. 48-55.

Brandt, J. W., "Convergence and continuity criteria for discrete approximations of the continuous planar skeleton", in CVGIP: Image Understanding, 59(1):116-124, Jan. 1994.

Bruck, J. et al., "Localization and routing in sensor networks by local angle information", Proc. 6th ACM International Symposium on Mobile Ad Hoc Networking and Computing (MobiHoc'05), pp. 181-192, May 25-27, 2005, Urbana-Champaign, Illinois, USA.

Choi, H.I. et al., "Mathematical theory of medial axis transform", Pacific Journal of Mathematics, 181(1):57-88 (1997).

Falchi, A., "The Berkeley motes environment", Chapter 3, pp. 17-51, available at URL: http://projects.mindtel.com/2005/SDSU.Geo1600.Sensor_Networks/sensornets.refs/Sensor%20Network%20performance%20measurements%20with%20motes%20technology%20—%20Alessio-Falchi/Chap3.pdf.

Fang, Q. et al., "GLIDER: Gradient landmark-based distributed routing for sensor networks", Proc. of the 24th Conference of the IEEE Communication Society (INFOCOM), vol. 1 pp. 339-350, Mar. 13-17, 2005.

Fekete, S.P. et al., "Neighborhood-based topology recognition in sensor networks", Algorithmic Aspects of Wireless Sensor Networks: First International Workshop, pp. 123-136, 2004.

Funke, S., "Topological hole detection and its applications", DIALM-POMC'05, Sep. 2, 2005, Cologne, Germany.

Ganesan, D.G. et al., "Complex behavior at scale: an experimental study of low-power wireless sensor networks", Technical Report UCLA/CSD-TR 02-0013, UCLA (2002), pp. 1-11.

Gao, J. et al., "Geometric spanner for routing in mobile networks", Proceedings of the 2nd ACM Symposium on Mobile Ad Hoc Networking and Computing (MobiHoc'01), pp. 45-55 (2001).

Guibas, L.J. et al., "A probabilistic roadmap planner for flexible objects with a workspace medial-axis-based sampling approach", Proceedings of the IEEE/RSJ International Conference on Intelligent Robots and Systems (IROS), pp. 254-260, Kyongju, IEEE Press, Korea (1999).

Kuhn, F. et al., "Ad-hoc networks beyond unit disk graphs", DIALM-POMC'03, Sep. 19, 2003, pp. 69-78, San Diego, California, USA.

Kwon, T.J. et al. "Efficient flooding with passive clustering (PC) in Ad Hoc Networks", ACM SIG COM—Computer Communication Review, pp. 44-56.

Li, J. et al., "A scalable location service for geographic ad hoc routing", Proceedings of 6th ACM/IEEE International Conference on Mobile Computing and Networking, pp. 120-130 (2000).

Li, Q. et al., "Sending messages to mobile users in disconnected ad-hoc wireless networks", Proceedings of 6th ACM/IEEE International Conference on Mobile Computing and Networking, pp. 44-55 (2000).

Lieutier, A., "Any open bounded subset of $R^n$ has the same homotopy type than its medial axis", SM'03: Proceedings of the Eighth ACM Symposium on Solid Modeling and Applications, Jun. 16-20, 2003, pp. 65-75, Seattle, Washington, USA.

Mainwaring, A. et al. "Wireless sensor networks for habitat monitoring", WSNA'02, Sep. 28, 2002, 10 pages, Atlanta, Georgia, USA.

Maroti, M., "Directed flood-routing framework for wireless sensor networks", LNCS 3231, pp. 99-114, 2004.

Seada, K. et al., "On the effect of localization errors on geographic face routing in sensor networks", IPSN'04, Apr. 26-27, 2004, pp. 71-80, Berkeley, California, USA.

Sheehy, D.J. et al., "Shape description by medial surface construction", IEEE Transactions on Visualization and Computer Graphics, 2(1):62-72, Mar. 1996.

Viswanath, K. et al. "Modeling the performance of flooding in wireless multi-hop ad hoc networks", Computer Communications, vol. 29, Issue 8, May 15, 2006, pp. 949-956.

* cited by examiner

```
Node{
    the medial axis graph (MAG);
    names of itself and one-hop neighbors;
    a bit to record if the node is on the medial axis;
    the neighboring medial axis nodes
}
```

GEOMETRIC ROUTING IN WIRELESS NETWORKS

CROSS-REFERENCE TO RELATED APPLICATION

This application claims the benefit of U.S. Provisional Application No. 60/673,271 filed Apr. 20, 2005 entitled Routing in Wireless Networks Based on Medial Axis and Other Geometric Features. The disclosure of 60/673,271 is incorporated herein by reference in its entirety.

STATEMENT AS TO RIGHTS TO INVENTIONS MADE UNDER FEDERALLY SPONSORED RESEARCH AND DEVELOPMENT

Work described herein has been supported, in part, by the National Science Foundation (Grant No. CCR-TC-0209042). The United States Government may therefore have certain rights in the invention.

BACKGROUND

Routing is elementary in all communication networks. Such routing involves transmitting network data traffic among the devices that communicate together and comprise nodes of the network. The design of routing algorithms is tightly coupled with the design of auxiliary infrastructure that abstracts the network connectivity. For networks with stable links and powerful nodes, such as the Internet, infrastructures such as routing tables are constructed and maintained so that routing can be performed efficiently at each router by a routing table look-up, and routing paths are close to optimum. For networks with fragile links, constantly changing topology, and nodes with less resourceful hardware, such as ad hoc mobile wireless networks, routing tends to be infrastructure-less and on-demand. However, without any auxiliary infrastructure, discovery of routes in such wireless networks may have to rely on flooding the network.

Flooding involves the broadcast of flood message packets across the network so that each node receiving a packet will rebroadcast that packet on links other than the receiving link. A network path query can be solved in this way, so that when a destination node receives the flood packet, it can report the path that was traversed, thereby identifying a network route from the original sending node to the destination node. Flooding can result in redundant rebroadcast of flood messages. This unnecessarily increases network traffic and increases node energy consumption. As a result, efficient routing is of great concern for those who are involved with planning for wireless networks.

One type of wireless network is the wireless sensor network. Such networks typically include many autonomous, battery-powered communication devices that include environmental sensors for collection of data and radio frequency transceivers for network communications and data transfer. Network routing is important because nodes may need to share information among themselves or may need to move data from an originating node to a destination node. In wireless sensor networks, where sensor nodes are movable but generally stationary and are deployed in a geometric space, each sensor node has a constrained power supply, and thus energy conservation is an important consideration in the design of routing protocols. Reactive routing protocols, which are designed mainly for ad hoc mobile wireless networks and rely on flooding for route discovery, are typically much too energy-expensive for sensor networks. It is also observed that wireless links for static sensor nodes, such as Berkeley motes, are reasonably stable. Therefore it is advantageous to preprocess the network and maintain some lightweight infrastructure so that efficient and localized routing can be performed.

A good intuition on how to build a lightweight and effective auxiliary infrastructure is that sensor networks are closely related to the geometric environment in which they are deployed. Two nodes can directly communicate when they are geographically close. Thus geometric proximity information has high correlation with network topology. This intuition has been used in geographical forwarding, which is used to efficiently and effectively make routing decisions based on the geographical locations of destinations and the one-hop neighboring nodes. In geographical forwarding, a packet is greedily forwarded to the one-hop neighbor that is geographically closest in position to the destination. Such an abstraction of the network connectivity based on the Euclidean coordinates of a node has tremendously simplified the design of routing protocols and improved routing efficiency. For a sensor network with uniform and dense sensor deployment in a flat and regular region, geographical forwarding has been found to be an efficient and scalable scheme that produces almost shortest paths with very little overhead.

An issue on the practicality of geographical routing is how to obtain the geographical locations of a large number of sensor nodes. An essential part of the preprocessing overhead of building the infrastructure for geographical routing is to solve the localization problem, namely, finding the Euclidean coordinates of the sensor nodes. Localization to physical coordinates can be achieved by either hardware support such as Global Positioning Systems (GPS), or by algorithms that determine the locations of sensor nodes from their local interactions. In fact, if sensors are densely deployed in a flat regular region with simple geometry (e.g., a disk with no holes), then greedy geographical routing is robust enough to localization errors, and approximate locations suffice. See, for example, A. Rao et al., in *Proceedings of the 9th annual international conference on Mobile computing and networking*, pages 96-108, ACM Press (2003); J. Bruck et al. in *Proc. 6th ACM International Symposium on Mobile Ad Hoc Networking and Computing (MobiHoc'05)*, May 2005.

The greedy geographical forwarding, however, runs into serious problems for sensor fields with complex geometry. In many of the real-world situations where sensor networks are deployed, such as metropolitan areas, warehouses, university campuses, and airport terminals, the sensor field naturally has a complex shape and can have many holes (regions where sensors are not deployed due to the existence of obstacles). When there are holes in a sensor field, greedy forwarding can fail when all the neighbors are further away from the destination. In other words, a route created by greedy forwarding tries to follow a straight line from source to destination, which is often blocked by obstacles in a complex environment. A number of ways have been devised to get around holes. For example, face routing or perimeter routing deals with this case by routing a packet along the face of a planar subgraph until greedy forwarding can be performed again. See B. Karp and H. Kung, in *Proc. of the ACM/IEEE International Conference on Mobile Computing and Networking (MobiCom)*, pages 243-254 (2000); P. Bose et al., in *3rd Int. Workshop on Discrete Algorithms and methods for mobile computing and communications (DialM 99)*, pages 48-55 (1999).

If the sensor network has rich geometric features, perimeter routing has to be adopted frequently. There are several issues with face routing or perimeter routing. The correct construction of the planar subgraph depends heavily on accurate location information, which is very hard to obtain, and the assumption that the communication graph is a unit disk graph, which does not hold in practice. See, for example, D. Ganesan et al., Complex behavior at scale: An experimental study of low-power wireless sensor networks; *Technical Report UCLA/CSD-TR* 02-0013, UCLA (2002). Inaccurate location information or a slight deviation of the communication graph from the unit disk graph model may cause the planar subgraph to be disconnected. See, for example, K. Seada et al., in *IPSN'04: Proceedings of the third international symposium on Information processing in sensor networks*, pages 71-80, ACM Press (2004). Further, perimeter routing creates awkward routing paths along the boundaries of holes. Overloading of nodes on the boundaries of holes exhausts the batteries of those nodes quickly, which will further enlarge the holes and eventually connect small holes to big holes or even disconnect the network.

The failure of greedy forwarding for sensor fields with complex geometry and/or non-trivial topology occurs mainly because the geographical location information, on which routing rules are based, does not correlate well with the connectivity graph. Two nodes that are geographically close may actually be far away in the connectivity graph. A good infrastructure for this case should not only abstract the geometric proximity of the sensors, but also the global geometric shape and topological features of the sensor field. This intuition is validated by the observation that the global shape and the topological features of the layout mostly reflect the underlying structure of the environment (e.g. obstacles), and they are likely to remain stable. Nodes/links may come and go. But only when such changes are of large quantity and geographically correlated, can they possibly modify the global shape of the sensor field, or destroy/create large-scale topological features. Thus we can afford to explicitly compute an abstraction of the geometry of sensors and carry out proactive routing at this abstract level, such that these high-level combinatorial routes can be efficiently realized in the network by localized and decentralized protocols.

A protocol that explicitly states the importance of topological information in routing in sensor networks with large holes, called GLIDER, was recently proposed by Fang et al. See Q. Fang et al., in *Proc. of the 24th Conference of the IEEE Communication Society* (*INFOCOM*), March 2005. GLIDER is a naming and routing scheme based on geographical landmarks, where the global topology of the network is represented by a compact abstract Delaunay triangulation on a set of landmarks, and is used in a global planning step to guide routes around holes. However, the performance of landmark-based routing algorithms heavily depends on the selection of landmarks; yet there is currently no theoretical understanding on how to select a good set of landmarks. Moreover, landmark-based routing depends on network nodes knowing their position relative to the landmarks, which can require complicated processing and communications resources. In addition, such routing sometimes depends on a set of stable, fixed physical locations within the sensor field. Any disruption to the landmark locations will cause the routing to fail. Increasing the size of the sensor network can require finding new landmarks, which can constrain scalability.

From the discussion above, it should be apparent that there is a need for a routing scheme for wireless networks that is resource efficient, independent of location information, and has good scalability. The present invention satisfies this need.

SUMMARY

Routing in a wireless network of communication devices that are located within a network boundary moves network traffic from a first communication device to a second communication device by first constructing a geometric abstraction of network connectivity that identifies a curve on which network nodes are located. Such a curve can be provided by, for example, the medial axis of the wireless network. Next, a network location for each node of the wireless network is determined, so that the network location of a node p identifies a node on the geometric indicator curve that is closest to the node p and indicates connectivity from the node p to the closest node of the geometric indicator curve. A routing scheme is determined, to route in the wireless network from the first communication device to the second communication device based on the respective determined network locations for the first and second communication devices. Using a geometric indicator of network connectivity means that no geographic position information or coordinate system for locating the nodes is required. Instead, only node connectivity information is used, indicating the network separation between nodes (such as hop counts) rather than using Euclidean (linear) distance between nodes based on an underlying coordinate system. Thus, no geographic position information is required for determining the routing scheme. In this way, the disclosed routing scheme provides a determination of network location for the nodes that is independent of geographic position information, so that the route can be determined efficiently without complicated processing or communications. Routes are efficiently determined and can be determined locally, at nodes of interest. Thus, the routing scheme easily adapts to new nodes and deletion of nodes, providing good scalability.

Other features and advantages of the present invention should be apparent from the following description of the preferred embodiments, which illustrate, by way of example, the principles of the invention.

DETAILED DESCRIPTION

1 Overview

One of the challenging tasks in the deployment of dense wireless networks, such as sensor networks, is in devising a routing scheme for node to node communications. Important considerations are scalability, routing complexity, the length of the communication paths, and the load sharing of the routes. In this description, we show that a compact and expressive abstraction of network connectivity can be provided by the medial axis, which enables efficient and localized routing. As described further below, other alternative geometric abstractions of network connectivity can be used in the disclosed route scheme. The medial axis implementation as described below is referred to as MAP, a Medial Axis based naming and routing Protocol that is location-free, makes routing decisions locally, and achieves good load balancing.

In a preprocessing phase, MAP constructs the medial axis of the nodes, defined as the set of nodes with at least two closest boundary nodes. The medial axis of the network captures both the complex geometry and non-trivial topology of the sensor field. It can be represented compactly by a graph whose size is comparable with the complexity of the geometric features (e.g., the number of holes). The location of each node within the network is determined with respect to the node position with respect to the geometric abstraction (i.e., relative to the medial axis). In one embodiment, the network location of each node is provided by a node naming convention that specifies the node network location with respect to the medial axis. The routing scheme is derived through local decisions by the names of the source and destination nodes and guarantees delivery with reasonable and natural routes. We show by both theoretical analysis and simulations that our medial axis based geometric routing scheme is scalable, produces both short routes and excellent load balancing, and is very robust to variations in the network model. The MAP scheme can be generalized by replacing the medial axis with other geometric abstractions that characterize the network environment, as described below, and can be applied to various types of wireless networks besides sensor networks.

1.1 Exemplary Embodiment

Figure 1:
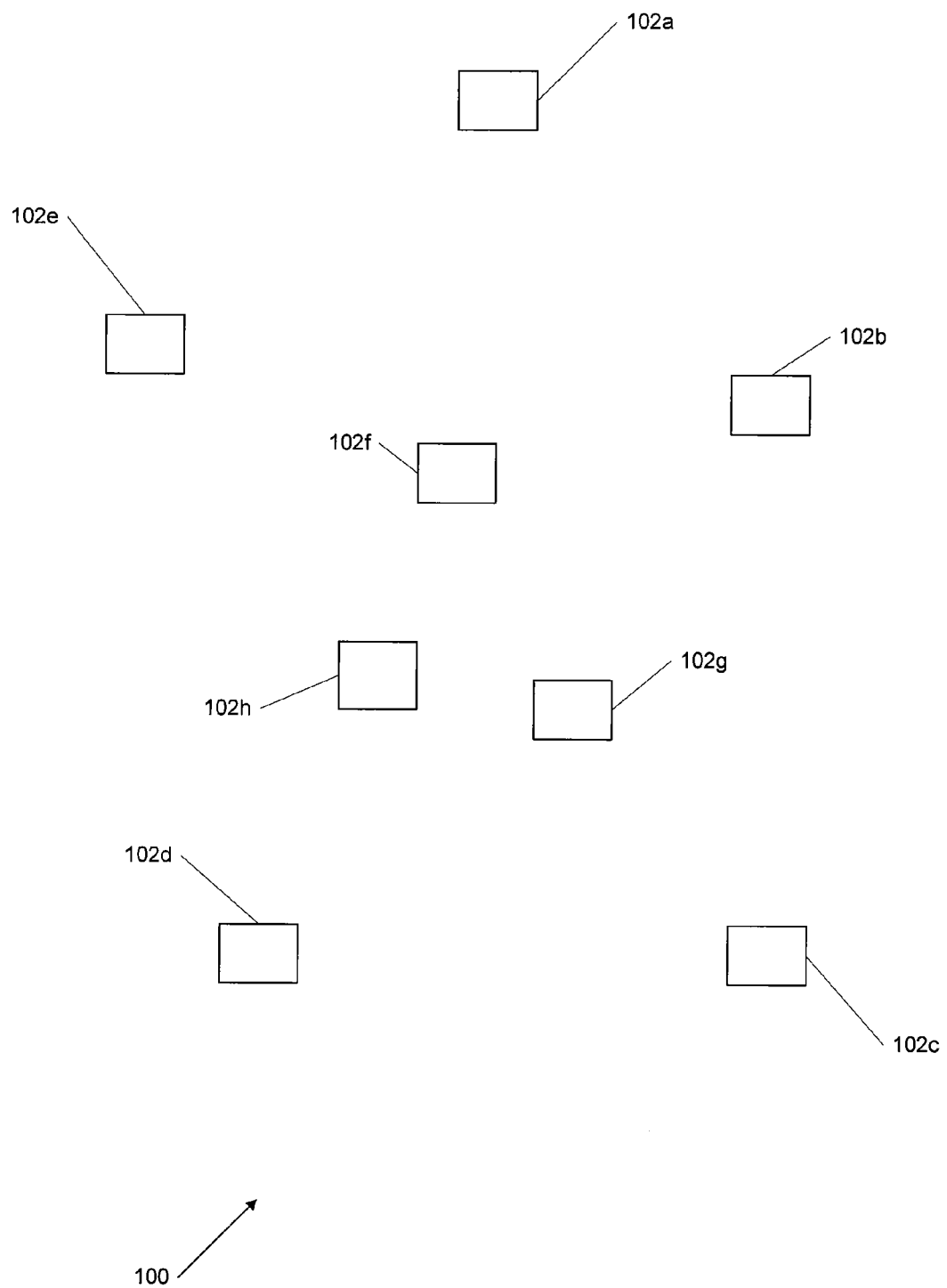
FIG. 1 is a block diagram representation of a wireless network with multiple communication devices constructed in accordance with the invention.

FIG. 1 is a block diagram representation of a wireless network 100 with multiple communication devices 102 constructed in accordance with the invention. In FIG. 1, all of the communication devices 102 have a similar construction. Particular communication devices 102 are designated with a letter suffix, so that the illustrated wireless network formed by the communication devices comprises individual devices 102a, 102b, 102c, . . . , 102h. Each of the devices 102 comprises a node of the wireless network. In the FIG. 1 illustration, boundary nodes comprise nodes that are on the periphery of the network 102a, 102b, 102c, 102d, 102e. Nodes that are not boundary nodes comprise nodes 102f, 102g, 102h that are located within the network boundary, in the network interior.

Figure 2:
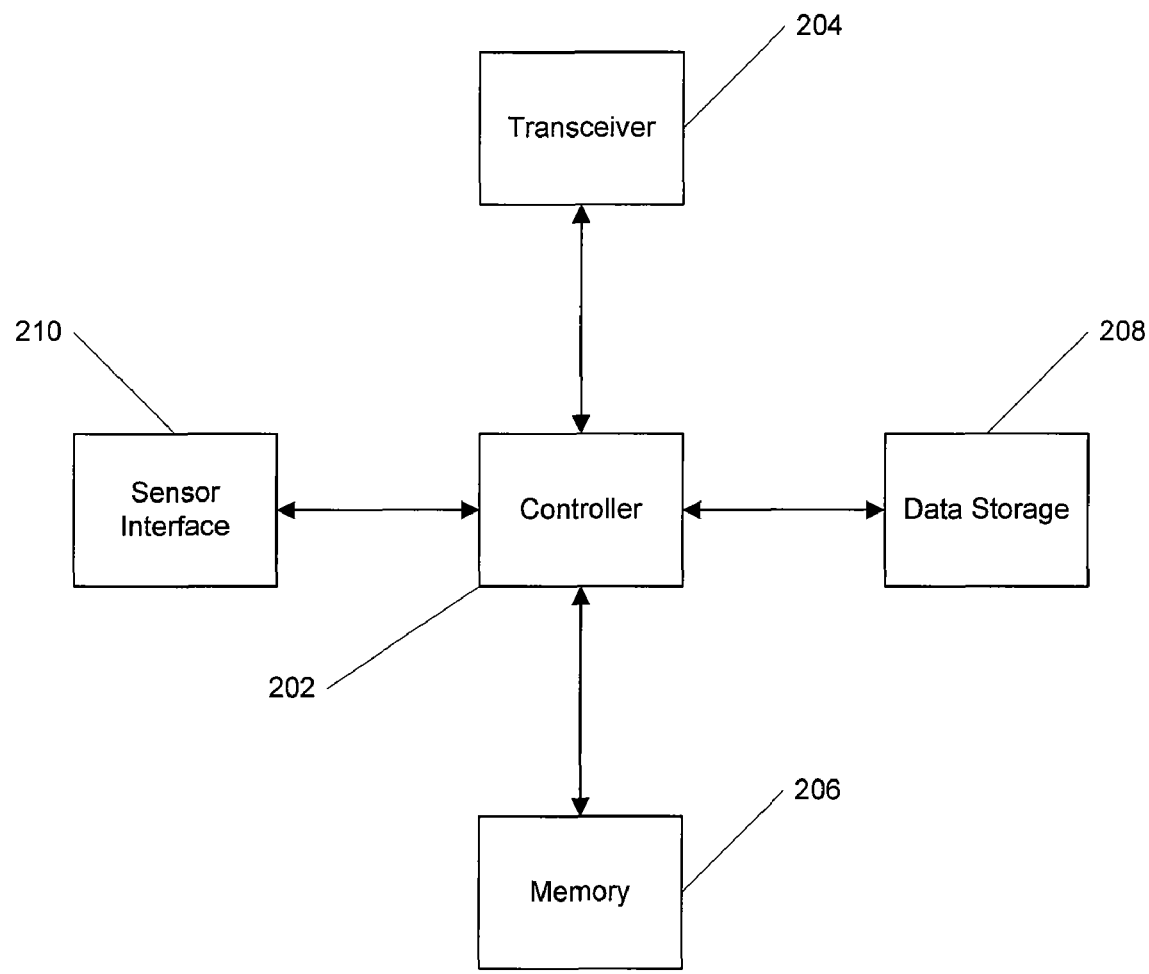
FIG. 2 is a block diagram that shows construction of one of the communication devices illustrated in FIG. 1.

FIG. 2 is a block diagram that shows construction of one of the communication devices 102 illustrated in FIG. 1. FIG. 2 shows that each communication device includes a controller 202, such as a microcontroller or central processing unit. The controller interfaces with a transceiver 204, by which the communication device can communicate with other communication devices that are within range of the transceiver. The communication device includes memory 206, such as program memory and RAM, and the device can also include non-volatile data storage 208, such as flash memory or the like. A typical communication device for wireless networks includes an 8-bit microcontroller, memory on the order of 4 KB to 256 KB, and data storage on the order of 32 KB to 512 KB. Other configurations for communication devices capable of wireless communication will be apparent to those skilled in the art. The communication device 102 typically receives power through one or more batteries (not illustrated in FIG. 2), and therefore the selection of memory 206 and data storage 208 will likely be dictated by power and cost concerns. The exemplary devices 102 illustrated in FIG. 1 comprise remote sensors, and therefore FIG. 2 shows that each device 200 includes a sensor interface 210 through which its controller 202 can receive sensor data. A sensor interface is not needed for communication devices that operate in wireless networks in which they do not perform a sensor function. The controller executes program instructions that are stored in device program memory and that cause operation of the communication device in accordance with the invention.

Figure 3:
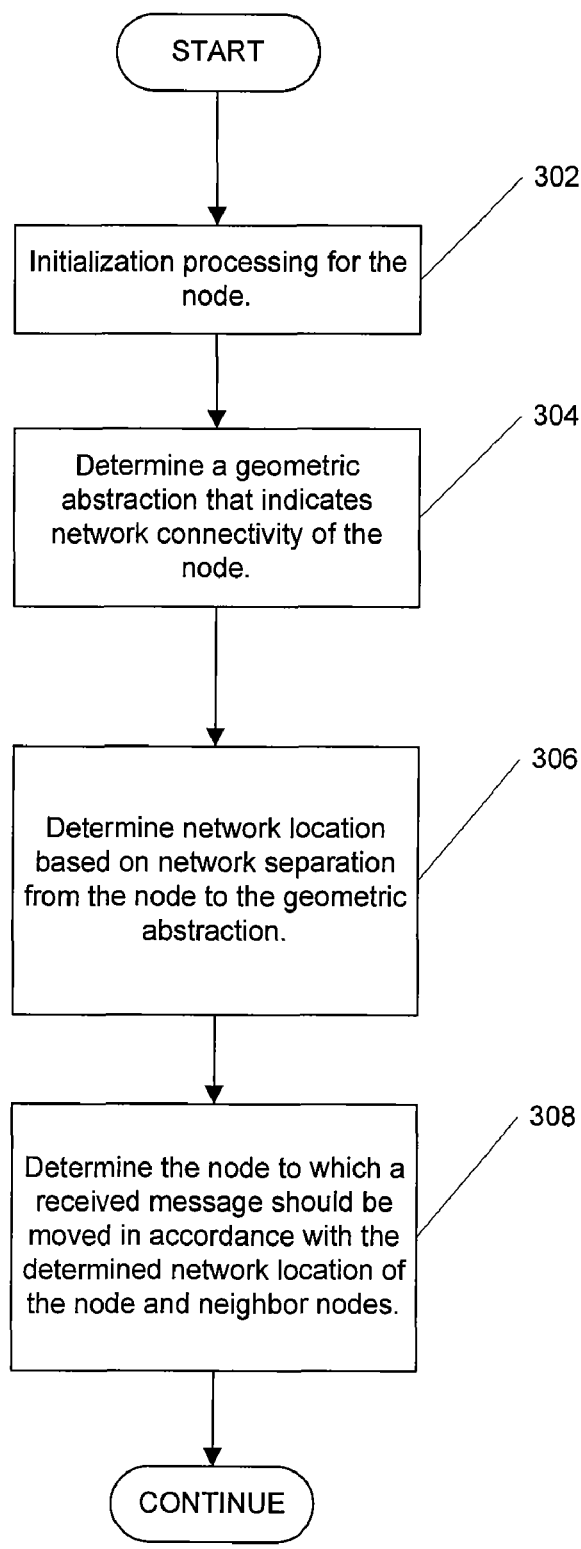
FIG. 3 is a flow diagram that illustrates processing of one of the communication devices illustrated in FIG. 1.

FIG. 3 is a flow diagram that illustrates processing of one of the communication devices 102 illustrated in FIG. 1. At the start of device processing, as represented by the flow diagram box numbered 302, any necessary start-up processing for initialization is performed in accordance with device configuration and network operations requirements. Such processing may include network communications initialization and the like. Next, processing continues at box 304 with processing to determine a geometric abstraction of the wireless network that indicates network connectivity. The geometric abstraction is not dependent on geographical information or physical position based on any underlying coordinate system (such as latitude and longitude). As described further below, network connectivity information is utilized to determine a curve that defines the geometric abstraction. Those skilled in the art will be aware that hop count between nodes is an indicator of network connectivity that is not dependent on geographical information. In one embodiment described further below, the geometric abstraction comprises the medial axis of the wireless network. In connection with determining the medial axis, the box 304 processing includes receiving and processing network messages from other nodes such that a node can determine whether it is a medial node.

In the next processing operation of FIG. 3, at box 306, a node determines its network location based on connectivity information such as separation of the node from the geometric abstraction and identifies itself in this fashion. This is a node naming operation in which each node assigns itself a network location (name) based on its separation from the geometric abstraction. For example, where the geometric abstraction is the medial axis, a node can determine its network location by its hop count from the medial axis.

As part of the naming operation 306, each naming node will check its direct neighbor nodes to determine if the neighbor nodes have completed corresponding naming operations. A direct neighbor node is a node with which the naming node can directly communicate, such as a node that is one hop count away. The naming node will query the neighbor node for a neighbor node name. If the neighbor node provides a name for itself, then the naming node will not determine another name for that neighbor node, but will store that provided name for identifying the neighbor node. Otherwise, the naming node will assign a name to the neighbor node. The naming process starts with nodes in the medial axis—which are nodes with a zero hop separation from the medial axis—and "propagates" to nodes farther away from the medial axis. First, each node in the medial axis (i.e., each medial node) gives itself a name based on its own location in the medial axis. Then, in general, when a node u that is h ($h \geq 0$) hops away from the medial axis has obtained a name, it will assign a name to each neighboring node v that is h+1 hops away from the medial axis. In this way, the name of every node uniquely specifies its location in the network, which is defined with respect to separation from the medial axis.

At box 308, a routing path is determined. Again, the processing is independent of geographic information concerning the wireless network. Thus, box 308 shows that a node that wants to move network data to a second node will determine a routing scheme based on the network location (name) of each node, using its own name and the network name of the second node. In accordance with the box 308 processing, each node determines only the next link or hop for the message being moved. That is, the message route from beginning to end is not determined in advance, rather, each node moves the message along a path that is in relation to the geometric abstraction, moving the message (and planning the route) one node hop at a time. Such processing can be easily accomplished by the communication devices.

As each node receives a message for moving across the network, the receiving node decides which of its neighbor nodes should be the next message hop. Where the geometric abstraction is the medial axis, each node processes according to box 308 under the principle that the routing path should be parallel to the current medial edge or should be moving from the current cell to the next cell. In this way, the message itself need not carry a list of routing nodes to be followed, so that the message size can be kept relatively small and energy for message transmission is reduced. Moreover, because a node only needs to know the names of itself and its direct neighbors, memory requirements for the nodes is reduced. It should be noted that, although the routing path followed according to this processing 308 may not be the shortest possible route, in practice it has been found to be quite close to the shortest path.

Thus, it is advantageous to follow the path determined in accordance with the box 308 processing, especially in view of the advantages mentioned above.

It should be noted that each node performs the processing of box 308 (routing) each time it receives a message for transport in the network. The processing of the other operations, comprising initialization (box 302), determining the geometric abstraction (box 304), and node location naming (box 306), need only be performed once for the wireless network. If a node is added to the network or deleted, then one or more of the initial operations (302-306) can be performed in response, depending on the network configuration and the capabilities of the communication devices. A node that is added to the wireless network will typically affect only those nodes that are neighbors of the added node, so that only the affected neighbor nodes need respond with processing. Thus, a node that is added and that performs its own initialization processing (box 302) at start-up will communicate with its neighbor nodes and will therefore identify itself to affected nodes. The processing of the new node and the affected nodes will ensure that proper initialization processing (box 302-306) is performed and that any new link information and network location names are properly implemented.

Figure 4:
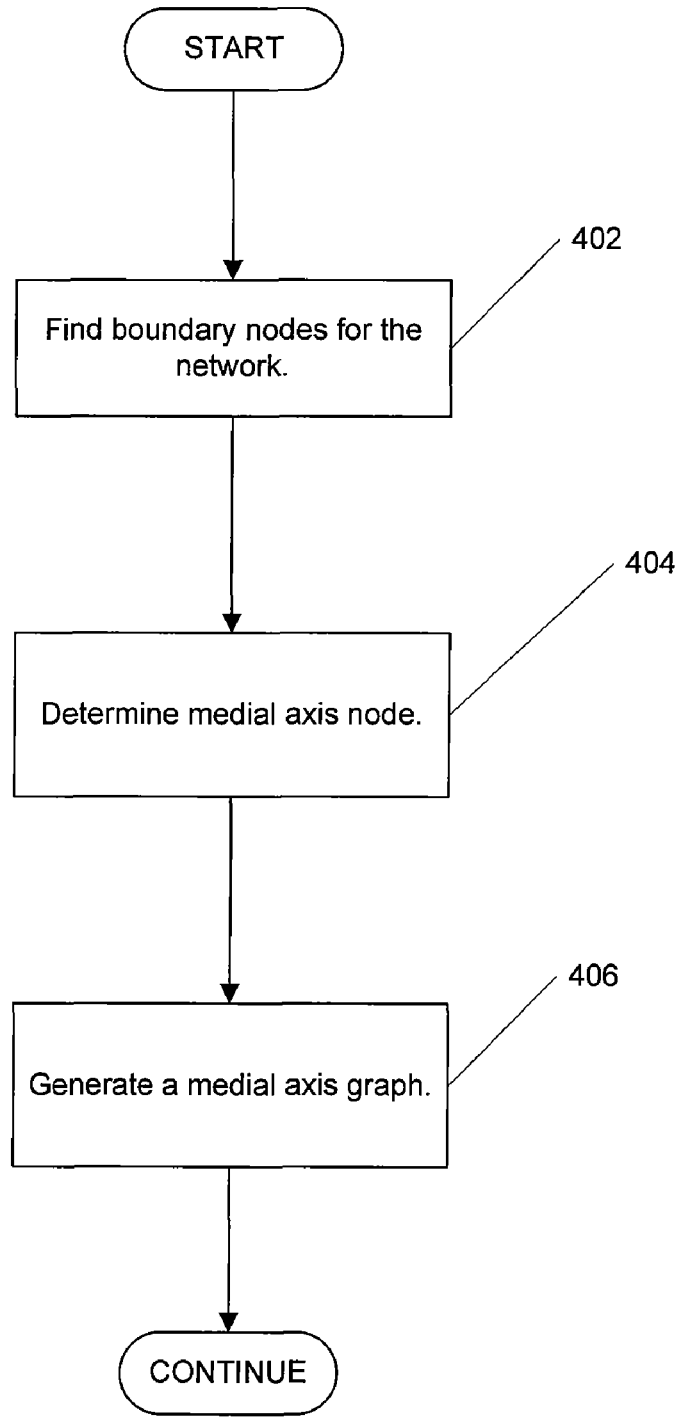
FIG. 4 is a flow diagram that illustrates processing of a FIG. 1 communication device in constructing a geometric abstraction.

FIG. 4 is a flow diagram that illustrates processing of a FIG. 1 communication device in generating the geometric abstraction, where the geometric abstraction has been selected to be the medial axis. In this way, FIG. 4 further illustrates the processing of box 304 (FIG. 3) for the determination of the medial axis. In the first operation for the medial axis, illustrated as box 402, the communication device finds boundary nodes for the wireless network. This process can be a manual process, in which a system administrator designates or otherwise provides data to a node on the boundary of the wireless network that identifies such a node as a boundary node. This manual identification can occur at the time the communication device is deployed into the network. Alternatively, the nodes themselves can include programming so that the nodes (communication devices) self-discover if they are a boundary node, once landmark nodes have been identified. Those skilled in the art will understand techniques in wireless networks by which nodes perform self-identification, following designation of landmark nodes, to determine if they are a boundary node.

In the next operation, represented by box 404, the node determines whether it is a node on the medial axis. Such a node is referred to as a medial node. The medial node processing involves the boundary nodes flooding the wireless network with messages. As noted immediately above, the boundary nodes know that they are boundary nodes. As the boundary node messages traverse the wireless network, each message includes hop counter data that indicates the number of node hops it has traveled from the originating boundary node from which it was sent. When a node receives the boundary node message, it discovers the number of hop counts it is from the corresponding boundary node. The node can then determine its closest boundary nodes. In general, the number of flooding messages can be reduced to be minimal in this way: if a node receives a message from a boundary node that is farther away in hop counts compared to its current nearest boundary node(s), then the receiving node will not forward the message. So each node keeps track of its current nearest boundary node(s). This type of operation keeps the energy consumption of the flooding to be relatively small. A node determines that it is a medial node if it has approximately equal hop counts to two boundary nodes that belong to two different boundaries, or if the node has approximately equal hop counts to two different boundary nodes that belong to the same boundary but are more than a predetermined hop count away from each other. In the box 404 processing, two nodes are approximately equal hop counts apart if their respective hop counts are different by no more than one hop. The predetermined hop count to indicate sufficient separation of two boundary nodes on the same boundary will be a function of the wireless network deployment, typically on the order of five to ten hop counts. The wireless network illustrated in FIG. 1, for example, has only one boundary. In general, a wireless network must have at least one hole to have more than one boundary. When a node determines its status with respect to the medial axis, it stores that information locally. That is, each node stores hop count information about the number of hop counts to its nearest boundary node neighbors and it stores information about whether it is, itself, a medial node.

The next processing operation for the medial axis geometric abstraction is to generate a medial axis graph (MAG) at box 406. The MAG is generated by determining the MAG vertices, which are the set of medial axis nodes, and by connecting the MAG vertices by identifying the closest medial axis node for each of the MAG vertices. Since each medial node is aware of its status as a medial node (that is, as one of the MAG vertices), each medial node will be able to determine its closest medial node neighbors. In this way, the MAG is generated by virtue of all the MAG vertices knowing their neighbor MAG vertices. Again, each medial axis node need only store information about itself and its neighbors. This completes the medial axis processing. After the medial axis processing is completed, a node will determine its network location.

Figure 5:
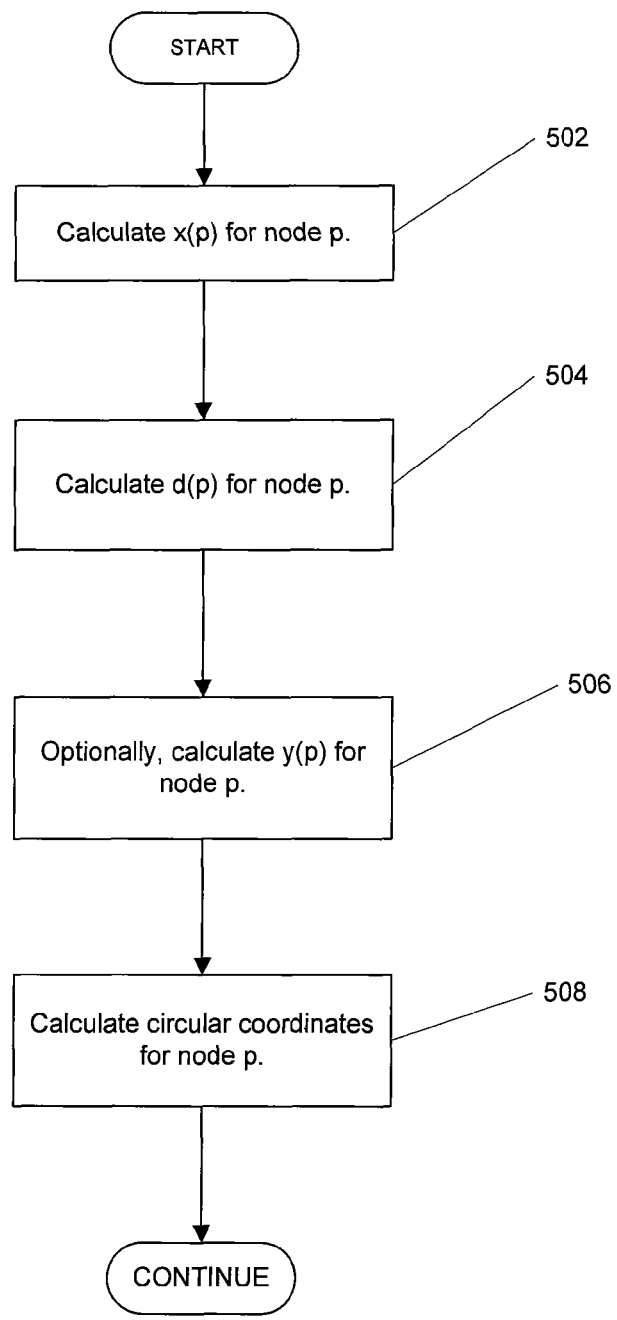
FIG. 5 is a flow diagram that illustrates processing of a FIG. 1 communication device in determining network node location.

FIG. 5 is a flow diagram that illustrates processing of a FIG. 1 communication device in determining network node location. In the illustrated embodiment, a node determines its location in the wireless network according to the hop count information it has stored relating to its neighbors. A node will name itself by determining at least two parameters: (1) the name of the medial node that is closest to the naming node and (2) the hop count from the naming node to the closest medial node. The result of this operation can be represented as $(x(p), d(p))$. Here $x(p)$ can be used to determine the closest medial node for the naming node p: if there are multiple nodes that have the same closest medial node, then their $x(p)$ differ so that they have different names. The naming node p determines its hop count separation to its closest medial node as $d(p)$. Thus, the name of the node p is given as the tuple $(x(p), d(p))$. The $x(p)$ value is expressed as a range, as described further below. Thus, if a node u is the closest medial node for a naming node p, then $x(p)$ is a sub-range of $x(u)$. Thus by looking at $x(p)$ and $x(u)$, we can tell that u is the closest medial node of node p.

The operation of a naming node determining its closest medial node $x(p)$ is represented in FIG. 5 by the flow diagram box numbered 502. In the box 502 processing, a node that is a medial node will complete its naming process before other nodes in the wireless network. That is, the naming process for the wireless network collectively will begin with the medial nodes, and the remaining nodes will name themselves in accordance with position relative to the medial axis. In particular, for a wireless network having n medial nodes, a medial node p that is naming itself will determine $x(p)$ as an x-range value $x(p)=[j-1, j]$, where the node p is the jth medial node of the n medial nodes. For example, in a wireless network with seven (7) medial nodes, the medial nodes give themselves consecutive numbers from an arbitrary starting point, and a medial node p that is the third medial node of the set will name itself with $x(p)=[2, 3]$. Any node that is not a medial node will wait to perform its box 502 processing until its neighbor node that is one hop closer to the medial axis has completed its respective node name processing 502. Thus, for determining the name of nodes, each node will proceed with name processing if it is a medial node, and will wait to be contacted by its corresponding medial node or one-hop closer node before proceeding with node name processing. The node naming process further includes a normalization operation that divides range along the medial axis into intervals. That is, for a node v with a node name $x(v)$ specifying a range of $[j-1, j]$, if the node v has k child nodes (nodes that are farther than v from the medial axis), then the x-range of v is partitioned into $(2k+1)$ subintervals and each of the even intervals is assigned to one of the child nodes as its corresponding x-range value. In the example above, if the medial node p has two child nodes, then k=2 and the medial node p will partition the [2, 3] range of p into (2k+1=5) intervals and will assign these two child nodes to names with the second and fourth intervals of the five partitioned intervals, so that the child nodes will have names with respective $x(p)$ range values comprising [2.2, 2.4] and [2.6, 2.8]. This naming interval process is useful in dynamic processing in response to addition and deletion of communication devices, as described further below. Those skilled in the art will understand that such operational timing between nodes can be implemented using query messages or status bits or the like.

In the operation of determining $d(p)$, the separation from a naming node to the closest medial node, a medial node p will have a $d(p)$ value equal to zero. A node that is not a medial node will have a separation to the medial axis (also referred to as its height from the medial axis) specified by its known hop count to the medial axis. It should be apparent from the recursive naming process described above, beginning with the naming of medial nodes, that nodes beginning with the medial nodes will assign names to their neighbor nodes that are one hop farther away from the medial axis relative to the naming node. This processing of the naming operation given by FIG. 5 is represented by box 504 and is described further below in connection with Section 4.1.3 Assign Names to Sensors.

As an optional node naming operation, a naming node p may execute programming that determines $y(p)$, which is the separation from the naming node to the closest boundary node of the wireless network. The boundary node information can be useful in route planning as described further below, but $y(p)$ is not necessary to determine a route in accordance with the invention. The processing to determine the $y(p)$ separation is represented in FIG. 5 by the flow diagram box numbered 506.

The last processing for the naming operation of FIG. 5 involves determining circular coordinates for a naming node. The need for circular coordinates in the wireless networks is for the case where a medial node (vertex) is on more than one medial edge of the medial axis. This situation is described further below in connection with Section 4.1.3 Assign Names to Sensors. For example, a medial node might have three neighbor nodes on the medial axis rather than just two neighbors. For a medial node p located at such a medial vertex, the node will name itself according to the range $x(p)$ having an angular range, $[0, 2\pi]$ and having a radius (height) of zero. For a node with k child nodes, its angular range will be divided into $(2k+1)$ angular intervals. It should be apparent that the angular naming convention will apply only to nodes that are at most R hops away from a medial vertex node, where R is the hop count separation from the medial vertex node to its closest boundary nodes. Each of those nodes will have both the non-angular name and the circular-coordinates name. It should be understood that the circular coordinate naming process represented in FIG. 5 by box 508 is performed only in cases where a medial vertex node is the naming node or is a parent node of the naming node. After all nodes of the wireless network have completed their respective naming operations as illustrated in FIG. 5, the nodes (communication devices) will be ready to receive messages and determine routing in the network to move the received messages to their intended destination nodes.

Figure 6:
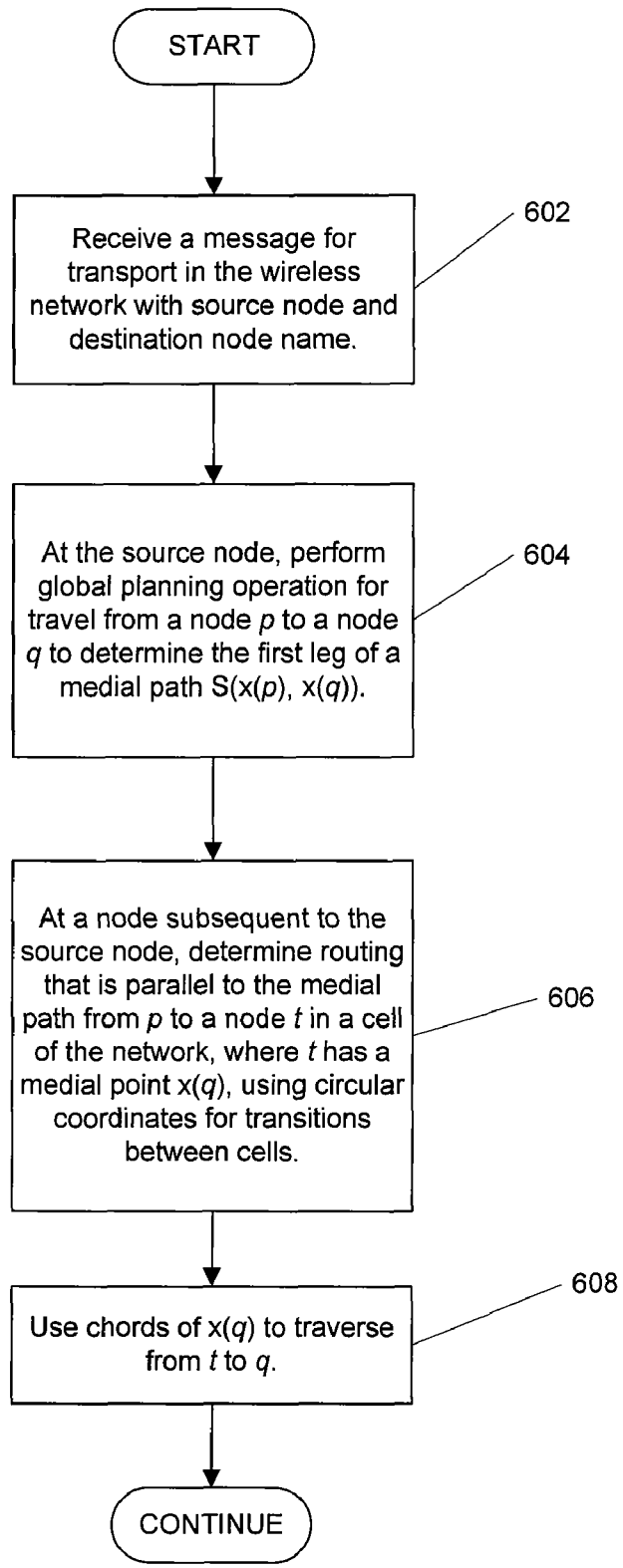
FIG. 6 is a flow diagram that illustrates processing of a FIG. 1 communication device in determining a route between two network nodes.

FIG. 6 is a flow diagram that illustrates processing of a FIG. 1 communication device in determining a route between two network nodes and passing along a message. Message processing begins with receipt of a message, either because another node has sent a message onto the network, or because the node in question has itself generated a message (meaning that the node in question is the source node). This processing is represented in FIG. 6 by the flow diagram box numbered 602. Each message is associated with the name of the source node and the name of the destination node. The name of the source node is supplied by the source node itself. The name of the destination node can be known to the source node in a variety of ways, such as through internal (local) processing or a stored default name or other identification scheme. For example, if the source node knows only a node ID name, then a location service of the wireless network can supply the name of the corresponding destination node. Other name-derivation schemes can involve hashing database tables and the like.

If a node is the source node, then a global planning operation is performed at box 604. The global planning operation involves finding the shortest path $S_A(x(p), x(q))$ on the medial axis graph (MAG) for the corresponding medial nodes of the source node p and the destination node q. To perform the processing of box 604, the source node identifies a medial axis path by identifying medial nodes having approximately the same x-range as the source node, but with height equal to zero. Thus, the next node (to which the source node will send the message) is in the same direction along the medial axis as the destination node, but is parallel (has the same height as the source node). For example, if a destination node has a node name with an x-range greater than that of the source node, then messages should be sent parallel to the medial axis in one direction, but if a destination node has a node name with an x-range less than that of the source node, then the message should be sent parallel to the medial axis in the other direction.

If a node is not the source node, as indicated at box 606, then when it receives a message for transport it performs operations to move the message along the path $S_A(x(P), x(q))$ on the medial axis graph (MAG) after first checking to see if it has a medial node that is the same as the medial node of the destination node. If the node checking is affirmative, the receiving node has the same medial node as the destination node, then the message has reached a node t and processing moves to the next operation (box 608). If a receiving node determines that it has reached a MAG vertex, which can be determined by the name of the receiving node, then it must be true that the message has reached a network cell transition, and the determination of the next node path must utilize circular range processing. If circular (angular) routing is not called for, then the receiving node passes the message to the next node parallel to the path $S_A(x(p), x(q))$ on the medial axis graph (MAG). That is, the receiving node will send the message to a neighbor node that is in the same direction along the $S_A$ medial axis as the destination node, but is parallel (has the same height as the receiving node).

If a node determines that it is a node t having a medial node that is the same as the medial node of the destination node, then the processing of box 608 is performed. At box 608, the communication device will use chords of x(q) to traverse from the node t to the destination node q. That is, it must be true that the message has reached a node that is of approximately the same range value as the destination, and all that is left is for the message to traverse toward the medial axis until the destination node is reached. That is, the name of the next node u to which the message will be sent should have the same x(u) value as the receiving node and should have a reduced d(u) value. This processing will be repeated until the message reaches the destination node q. The message will then be delivered and the processing of FIG. 6 is then concluded.

In the description that follows, a more detailed discussion of the processing and underlying principles of the novel node naming and routing protocol will be provided. The discussion begins with description of the geometric abstraction. Section 2 provides an overview of the proposed protocol. Section 3 provides a description of the protocol using the Medial Axis geometric abstraction for the general case of an idealized wireless network with nodes sufficient in number to comprise a continuous case for the protocol. Section 4 provides a description of a wireless network with discrete nodes (communication devices) and explains the protocol in terms of discrete network nodes rather than the general continuous case. Section 5 describes the results of simulation trials for the protocol design. Section 6 describes some protocol implementation refinements. Section 7 summarizes the findings.

1.2 Discussion of the Geometric Abstraction of the Network

In this description, we explore an appropriate geometric abstraction of sensor networks that enables efficient and localized routing. The shapes of regions or surfaces have been studied extensively in computational geometry, and various structures have been proposed for efficient representation of shapes. One of them is the medial axis, which is defined as the set of points with at least two closest neighbors on the boundaries of the shape. See, for example, H. I. Choi et al., *Pacific Journal of Mathematics,* 181(1):57-88 (1997). The medial axis is a "skeleton" of a region that captures both geometric and topological features. Therefore it has been used extensively to represent, reason about and explore properties of shapes, in areas such as robot path planning, surface reconstruction, and shape classification. For robot path planning, see, for example, L. Guibas et al., in *Proceedings of the IEEE/RSJ International Conference on Intelligent Robots and Systems (IROS),* pages 254-260, Kyongju, IEEE Press, Korea (1999). For surface reconstruction, see, for example, N. Amenta et al., *Graphical Models and Image Processing,* 60:125-135 (1998); N. Amenta et al., *Comput. Geom. Theory Appl.,* 19:127-153 (2001). For shape classification, see, for example, D. J. Sheehy et al., *IEEE Transactions on Visualization and Computer Graphics,* 2(1):62-72 (1996).

In this description, we show that the medial axis of a sensor field is a good abstraction of the communication network. The medial axis can be constructed efficiently by only the connectivity information, can be represented compactly by a graph whose size is proportional to the number of large geometric features, and enables an efficient gradient descending routing algorithm.

2 Proposed Protocol

In the following description, a technique called MAP is proposed. In one embodiment, MAP is a naming and routing protocol using the medial axis, a geometric abstraction of the wireless network topology, as a routing infrastructure for sensor networks, in particular those with complicated geometric and topological features. Our MAP naming and routing take a compact abstraction of the global topology of the sensor field. The GLIDER technique, mentioned previously, refers to a network abstraction. See the reference above to GLIDER, Q. Fang et al., in *Proc. of the 24th Conference of the IEEE Communication Society* (*INFOCOM*), March 2005. Nevertheless, the MAP technique takes only the communication network connectivity as input and makes no strong assumption that the communication network is a unit disk graph. The MAP technique described herein includes two operations that will be characterized as protocols: the Medial Axis Construction Protocol (MACP) that constructs the medial axis and the corresponding naming scheme at the initialization stage of the network; and the Medial Axis based Routing Protocol (MARP), which, with the help of a compact medial axis graph, routes packets by local gradient descent with only the names of source and destination.

The construction of the medial axis has several steps, such as illustrated in FIG. 7, for an example. FIG. 7(a) shows a sensor network representation. We first select a set of samples on hole boundaries (including the outer boundary). See FIG. 7(b). By connecting the samples, we find most of the boundary nodes, as illustrated in FIG. 7(c). The medial axis is identified as the set of nodes with at least two closest points on boundaries (see FIGS. 7(d) and (e)), and is represented by a medial axis graph which is a combinatorial graph with size proportional to the number of large geometric features. This medial axis graph is very compact and is known to every sensor. See, for example, FIG. 16(d) for a medial axis graph. Each sensor is given a name with respect to the medial axis graph (FIG. 7(f)). In particular, for each sensor w on the medial axis, we define a chord as the shortest path from w to one of its closest sensor nodes on the boundary. The chord is approximated by a shortest path tree in the final implementation. A sensor's name includes the chord on which it stays, and a normalized distance to its corresponding medial axis sensor. Such a naming scheme partitions the sensor field into canonical regions inside each of which a local Cartesian coordinate system is defined with one axis as an edge on the medial axis graph and the other axis as a chord of a vertex on the medial axis graph. The local Cartesian coordinate systems are glued together in exactly the same way as indicated by the edge adjacency of the medial axis graph, and provide a smooth and natural road system for the MAP routing algorithm.

Thus, as shown in FIG. 7, we create a scenario of a dense sensor network deployed inside an ellipse-shaped geometric region with an obstacle in the middle. There are 3000 sensor nodes, each with a communication radius of 1. The locations of the nodes are discarded after we create the scenario. The global geometry/topology of the network is inferred from the communication network. The sequence of illustrations in FIG. 7 illustrate how to construct a medial axis in a sensor network, including: (a) a sensor network; (b) a small sample of hand picked boundary nodes in the network; (c) discovery of more boundary nodes based on the sampled boundary nodes; (d) nodes on the medial axis; (e) the medial axis; (f) balanced shortest-path trees rooted on the medial axis.

MAP routing is performed in two steps, first on the abstract medial axis graph which is usually of small size, and then in each canonical cell by reactive local gradient descent routing. By using the medial axis graph in a global planning step, a source can find the reference path, defined as the shortest path in the medial axis graph, from the medial axis point corresponding to the source to the one corresponding to the destination. The actual routing is of manhattan-type, i.e., first trying to match the medial axis point with that of the destination and routing in parallel with the reference path, and then trying to match the distance to the medial axis point with that of the destination and routing along chords. Both routing in parallel with the medial axis and along chords can be realized by efficient local gradient descending in the local coordinate systems of the canonical regions. Although nodes on boundaries and the medial axis are important for representing the global geometry and topology, they play the same role as the other nodes in the actual MAP routing. The construction of the medial axis infrastructure incurs only modest preprocessing overhead. Routing is implemented in a localized fashion and thus is scalable.

In summary, the disclosed MAP technique has the following good properties:

Location-free: no geographical location is required and only the connectivity graph suffices;

Expressive: our medial axis based infrastructure captures the large geometric and topological features of a sensor field;

Compact: the medial axis can be represented by a graph of size proportional to the complexity of large geometric and topological features;

Lightweight: the construction and maintenance of the medial axis is lightweight;

Efficient: the medial axis based routing algorithm uses local gradient descent and is localized;

Load balancing: the medial axis based routing algorithm does not overload any nodes because of design defect;

Robust to network model: MAP does not require that the network model is a unit disk graph and is very robust to variations in network model.

The MAP scheme presented in this paper can be naturally generalized by replacing the medial axis with other geometric abstractions that characterize the network environment, and can be applied to various types of wireless communication networks besides sensor networks.

3 Medial Axis Based Naming and Routing on Continuous Euclidean Domain

In this section we present medial axis based naming and routing schemes for a continuous region in the Euclidean plane. All the concepts can be illustrated very nicely for the continuous case. Most wireless networks, however, do not contain a sufficient number of communication devices to approach the continuous case, but rather are more accurately viewed as a discrete distribution of devices. In the next section, we'll describe how to adapt the ideas from this section for the continuous case to a discrete sensor field. But first, in this section, we define the notion of medial axis and then illustrate the ideas of our naming and routing schemes.

3.1 Medial Axis

We first review the definition of a medial axis for a continuous curve in the Euclidean plane. The medial axis of a curve F is a set of points in the plane which have two or more (instead of one) closest points in F. See, for example, H. Blum in W. Wathen-Dunn, editor, *Models for the Perception of Speech and Visual Form, pages* 362-380, MIT Press (1967). In other words, for a point on the medial axis of a curve F, if we grow a ball at the point until the ball hits F, then the ball has two or more tangent points on F. The medial axis can be thought of as the Voronoi cell boundaries of the Voronoi diagram defined on an infinite set of points on F. The Voronoi diagram of a set of points S in the Euclidean plane is a planar graph that partitions the plane into convex cells such that all the points inside a cell have the same closest neighbor of S. In particular, a point on the Voronoi cell boundary has equal distance to at least two points in S. Further information about Voronoi diagrams can be found in M. de Berg et al., Computational Geometry: Algorithms and Applications, Springer-Verlag, Berlin (1997).

In this section, we study the medial axis of a bounded region in the Euclidean place. Suppose R is a bounded open set in $\mathbb{R}^2$, we denote by $\partial R$ the boundary curve of R. The medial axis of $\partial R$ is denoted by A. It has been proved that for a piecewise analytic boundary in the plane, the medial axis is composed of a finite number of continuous curves. See, for example, H. I. Choi et al., *Pacific Journal of Mathematics*, 181(1):57-88 (1997). Strictly speaking, the medial axis of $\partial R$ has two parts in the interior and the exterior of R respectively. In this paper we focus on the part inside R. For each point $\alpha$ on the medial axis, we can draw a disk with two or more tangent points on the boundary $\partial R$. The line segment connecting a point $\alpha$ on the medial axis with its tangent point on $\partial R$ is called a chord of $\alpha$. We define a medial ball $B_r(\alpha)$ to be a (closed) ball centered at $\alpha \in A$ with radius r, which is tangent to $\partial R$ at more than one point, and has no point of $\partial R$ in its interior $B_r(\alpha) - \partial B_r(\alpha)$. Then r is called the medial radius of the point $\alpha \in A$, denoted as $r(\alpha)$. A point on A with at least three closest points in $\partial R$ is called a medial vertex. A segment on the medial axis bounded by two medial vertices is denoted as a medial edge. FIG. 8 shows an example.

FIG. 8 shows an example of the medial axis of the boundary of a closed region R. In FIG. 8, only the part of the medial axis inside the interior of R is shown. The boundary region $\partial R$ is shown in FIG. 8 by thick curves. The medial axis A has a cycle, which means that the region R has a punched hole. FIG. 8(*a*) shows the medial axis of the boundary $\partial R$ and two medial vertices; FIG. 8(*b*) shows the naming scheme; FIG. 8(*c*) shows the road system on R; FIG. 8(*d*) shows the routing from p to q.

The medial axis A of the boundary $\partial R$ retains all the topological information of the region R. To be precise, it has been shown that any bounded open subset in $\mathbb{R}^k$ is homotopy equivalent to its medial axis. A homotopy equivalent is defined thusly: Two maps f and g from X to Y are said to be homotopic if there exists a continuous map $H: X \times [0, 1] \to Y$ with $H(x, 0)=f(x)$ and $H(x, 1)=g(x)$. Two spaces X and Y have the same homotopy type if there are continuous maps $f: X \to T$ and $g: Y \to X$ such that g of is homotopic to the identity map of X and f o g is homotopic to the identity map of Y. In other words, the maps f and g define a one-to-one correspondence of the topological features such as connected components, cycles, holes, tunnels, etc, and how these features are related. See, for example, H. I. Choi et al., *Pacific Journal of Mathematics*, 181(1):57-88 (1997); A. Lieutier, in *SM'03: Proceedings of the eighth ACM symposium on Solid modeling and applications*, pages 65-75, ACM Press (2003). Therefore, the medial axis can be used as a guideline on how to route from one point to another since it is a compact structure with exactly the same topological features as the underlying domain.

3.2 Naming Scheme

Each point in R is assigned a name. We denote by |pq| the Euclidean distance between p and q. The name of a point p is N(p), given by a triple $N(p)=(x(p),y(p), d(p))$, where $x(p) \in A$, $y(p) \in \partial R \cup \{\bot\}$, with $\bot$ representing 'invalid', $d(p) \in [0, 1]$. If a point p is on the medial axis A, we define its name as $(p, \bot, 0)$. If p is not a point on the medial axis, then we define its name as $N(p)=(x(p), y(p), d(p))$, where p stays on a chord $x(p)y(p)$, with $x(p) \in A$, $y(p) \in \partial R$, and $d(p)$ being the normalized distance from p to $x(p)$. Namely, $d(p)=|px(p)|/r(x(p))$, with $r(x(p))$ as the medial radius of $x(p)$, $r(x(p))=|x(p)y(p)|$. We also call the point $x(p)$ the medial point of p, we call the point $y(p)$ the boundary point of p, and we call $d(p)$ its height, $0 \leq d(p) \leq 1$. See FIG. 8(*b*) for an example.

The naming scheme is a valid scheme, because each point has a unique name. To prove this, we first show a couple of lemmas.

Lemma 3.1. For a point p not on the medial axis, if p is on a chord xy, with $x \in A$, $y \in \partial R$, then y is p's only closest point on $\partial R$.

PROOF. Since p is not on the medial axis A, p has only one closest point on $\partial R$. Assume p's closest point on $\partial R$ is $y' \neq y$. Then $|xy'| \leq |xp|+|py'| < |xp|+|py|=|xy|$, by triangular inequality. This leads to a contradiction with the fact that xy is a chord.

Lemma 3.2. If p is not on the medial axis, there is a unique chord through p.

Figure 9:
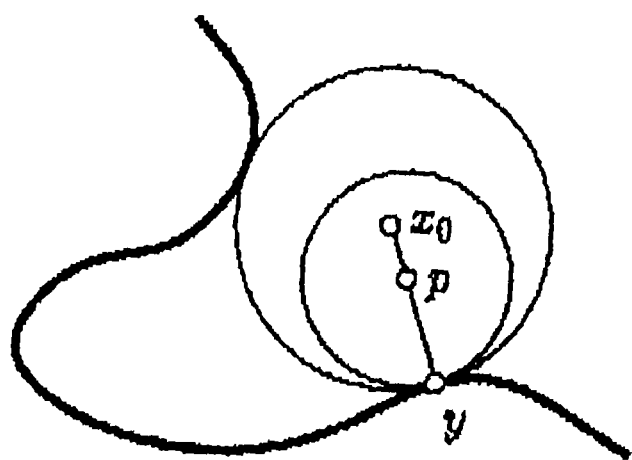
FIG. 9 is a representation of a node p in the wireless network of FIG. 1 that illustrates specifying node location in accordance with the invention.

PROOF. The proof for Lemma 3.2 is best understood with reference to FIG. 9, in which each point p not on the medial axis has exactly one chord though it. More particularly, since p is not on the medial axis, p has one and only one closest point on the boundary $\partial R$, denoted as y. The ball centered at p with radius |py|, $B_{|py|}(p)$, is tangent to $\partial R$ at only one point y and has no other points of $\partial R$ inside. Now we define a family of balls $B_{|xy|}(x)$, where x is on the line defined by p, y with p on the interior of the line segment xy. As x moves away from p, the ball $B_{|xy|}(x)$ is enlarged. Designate the point $x_0$ as the first node such that $B_{|x_0 y|}(x_0)$ is tangent to at least two points on the region $\partial R$. Thus $x_0 y$ is on the medial axis since it is tangent to at least two points on $\partial R$. So the line segment $x_0 y$ is a chord through p.

Next we show that the point p cannot stay on two chords. Assume otherwise, that p is on two chords xy and x'y'. If $y \neq y'$, then by Lemma 3.1, p has two closest points, which is not possible. If $y=y'$, then x, x', and $y=y'$ are collinear. Suppose that x is on the interior of x'y. Thus the medial ball of x is completely inside the medial ball of x'. The medial ball of x has at least two points of $\partial R$ on its boundary, one of which must be inside the medial ball of x'. This leads to a contradiction.

Now we can prove Theorem 3.3.

Theorem 3.3. Every point in R is assigned a unique name.

PROOF. When $p \in A$, the theorem is true. When p is not on the medial axis, there is a unique chord xy through p, by Lemma 3.2. By our naming scheme, p's name is defined as $N(p)=(x,y,|xp|/|xy|)$. Suppose two points p, q have the same name, $N(p)=N(q)$, then they are on the same chord $x(p)y(p)$ (same as $x(q)y(q)$). Further $d(p)=d(q)$, so p, q must be the same point.

The above naming scheme can be thought of a Cartesian coordinate system aligned with the medial axis. For the purpose of routing, some of the points in R are also given local circular coordinates. For each medial vertex, a has at least three closest points on $\partial R$. We assign local circular coordinates to all the points within the medial ball $B_r(a)$. Specifically, we take $b \in \partial R$ as one of the closest point of a. Assign a circular coordinate $C(b)=(1, 0)$ to b. Each point p inside $B_r(a)$ is assigned a circular coordinate $C(p)=(|ap|/r, \angle bap)$ (an angle is measured counterclockwise) with respect to a. See FIG. 8(*b*) for an example. From now on we will call N(p) the name of p and C(p) its circular coordinates.

3.3 Road System

The naming scheme naturally produces a road system on the region R. The medial axis A and all the chords of medial vertices partition the region R into a set of canonical cells $\{C_i\}$, $i=1, \ldots m$. Each canonical cell $C_i$ is bounded by two chords, a medial edge and a segment of the boundary $\partial R$.

Each medial edge belongs to two canonical cells. A point on the medial axis with k chords is adjacent to k canonical cells. We define an h-latitude curve as a collection of points in C with height h, for $0 \leq h \leq 1$, and an x-longitude curve as a chord in C with medial point x. It should be apparent that an x-longitude curve in the set C is a continuous line segment. The following theorem (Theorem 3.5) will show that the h-latitude curve is also continuous. We first introduce Lemma 3.4.

Lemma 3.4. Inside a canonical cell, any two chords have no common intersection.

PROOF. Suppose two chords xy, x'y' have a common intersection z, with x, x'∈A, y, y'∈∂R. If z=x=x', then x has two chords inside the same canonical cell, which is a contradiction with the definition of canonical cells. Otherwise, z is not on the medial axis and stays on two chords, which is a contradiction with Lemma 3.2. So Lemma 3.4 is proved.

Denote by $S_R(P, q)$ the shortest path between p, q inside a domain R. The distance between two points p, q inside R, i.e., the length of the shortest path $S_R(P, q)$, is denoted as $d_R(p, q)$.

Theorem 3.5. For a canonical cell C partitioned by the medial axis and all the chords of medial vertices, the collection of points with height h, $0 \leq h \leq 1$, is a continuous curve.

Figure 10:
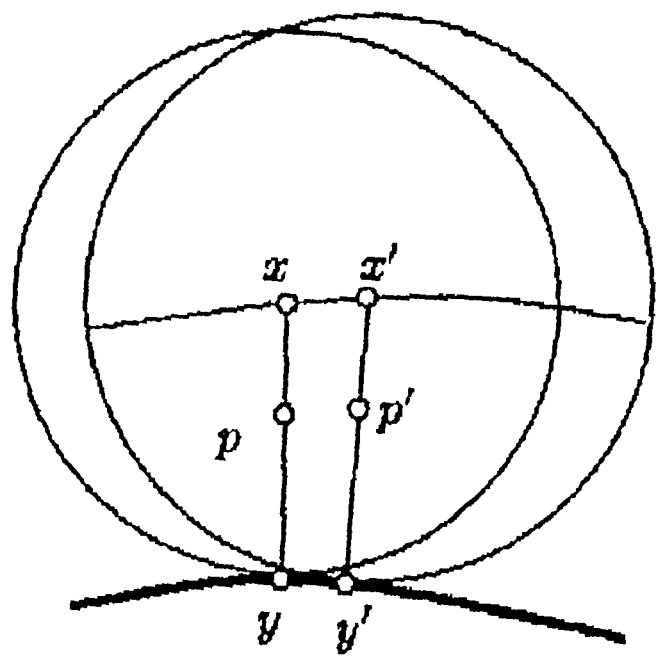
FIG. 10 is a representation of an h-latitude curve in the wireless network of FIG. 1 for routing in accordance with the invention.

PROOF. To prove Theorem 3.5, we show that for any point p in C with height h, we can find a point p' with height h within distance ε, for any ε>0. Suppose p stays on a chord xy, with x∈A, y∈∂R. Both the medial axis A and the boundary ∂R are continuous, thus we can always find a chord x'y', with x'∈A, y'∈∂R, such that $d_A(x, x') \leq \delta$, $d_{\partial R}(y,y') \leq \delta$, $\delta = /(1+2h)$. The chord can be found as follows, we first pick a chord ab with a∈A, b∈∂R such that $d_A(x,a) \leq \delta$. If $d_{\partial R}(y,b) \leq \delta$, then we take ab as the required chord x'y'. Otherwise, we take a point y' on ∂R such that y' is in between y and b and $d_{\partial R}(y, y') \leq \delta$. The chord on which y' stays on is denoted as x'y'. Then x' must be in between x and a on A and $d_A(x, x') \leq d_A(x, a) \leq \delta$, due to Lemma 3.4. See FIG. 10, which shows that the h-latitude curve in a canonical cell is continuous. The h-latitude curve in a canonical cell is continuous. By triangular inequality, |xy|−2δ≤|x'y'|≤|xy|+2δ. We take the point p' on the chord x'y' with height h. Then |xp|−2hδ≤|x'p'|+2hδ. Then |pp'|≤||xp|−|x'p'||+ $d_A(x, x') \leq (1+2h)\delta = \epsilon$. So the theorem is proved.

The latitude and longitude curves provide a Cartesian coordinate system for the points inside a cell C. Routing for two points inside the same cell can be obtained efficiently by first following the latitude curve to a point on the same chord as the destination, then following the longitude curve to the destination. The continuity of the h-latitude curve, proved by Theorem 3.5, implies that such routing can be implemented by local gradient descending. Specifically, routing following a latitude curve (longitude curve) is simply following the local gradient with the same height (the same medial point).

The coordinate system defined by latitude and longitude curves is a local one, i.e., defined only on points inside a canonical cell C. For routing across cells, our goal is to transmit from one local system to another one smoothly. If two cells $C_1$, $C_2$ share a common chord xy, then the point on xy with height h is shared by the Platitude curves in $C_1$ and $C_2$. However, it is possible that a pair of medial edges $e_1$, $e_2$ are adjacent (they share a common medial vertex), but the cells $C_1$, $C_2$ do not share a common chord, where $e_1$ is on the boundary of the cell $C_2$ and $e_2$ is on the boundary of the cell $C_2$. See FIG. 8(c) for an example. In order to transit from $C_1$ to $C_2$, we use a "rotary" element at each medial vertex, which is defined by the circular coordinate system inside the medial ball of a medial vertex.

For the points inside a medial ball of a medial vertex u, we define an l-circular curve as the set of points with circular coordinates (l, •), i.e., the circle centered at u with radius l, for $0 \leq l \leq 1$. The circular curves are co-centric circles with the same center u. If two medial edges $e_1$, $e_2$ share a medial vertex u and $C_1$, $C_2$, are two cells with $e_1$, $e_2$ on the boundary respectively, then the Platitude curve in $C_1$ can be connected to the Platitude curve in $C_2$ by the h-circular curve of the medial vertex u.

3.4 Routing Scheme

The routing is performed by using only the names of the source p and the destination q and the medial axis A of the domain R. Suppose N(p)=(x(p), y(p), d(p)), N(q)=(x(q), y(q), d(q)), where x(p), x(q) are two points on the medial axis A. We first find the shortest path $S_A(x(p), x(q))$ between x(p) and x(q) on A, which is denoted as the reference path. The length of the shortest path $d_A(x(p), x(q))$ is denoted as the reference distance. An intuitive path between p, q is to route from p to x(p) on the medial axis A, follow $S_A(x(P), x(q))$ until x(q) is reached, and route from x(q) to q. However, such paths use the medial axis as a routing "backbone" and A will be heavily loaded. In our routing scheme, the routing path P(p, q) is a lifted up version of $S_A(x(p), x(q))$. Our routing scheme has two steps. First we route parallelly to $S_A(x(p), x(q))$ until we reach a point t whose medial point is x(q). The routing path produced is denoted as $P_1(p, q)$. Secondly, we follow the chords of x(q) or the circular curves of x(q) to reach the destination q. The routing path produced by the second step is denoted as $P_2(p, q)$. FIG. 8 (iv) shows an example. In the following we present the two steps separately.

3.4.1 Routing in Parallel to the Medial Axis

The routing path parallel to the reference path $S_A(x(P), x(q))$ is realized by local gradient descent routing. The path $S_A(x(p), x(q))$ is partitioned by medial vertices $x_i$ to medial edges $x_i x_{i-1}$ (the first segment and the last segment may be only part of medial edges), $x_0 = x(p)$, $x_k = x(q)$ Suppose that p is inside a cell $C_0$, with $x_0 x_1$ on the boundary of $C_0$, then the routing path follows the d(p)-latitude curve in $C_0$ until it hits a chord on the boundary of $C_0$. Now we take a cell $C_1$ with $x_1 x_2$ on the boundary. $C_0$ and $C_1$ share at least a medial vertex $x_1$. If they share a chord $x_1 y_2$, then the d(p)-latitude curve in $C_0$ is automatically connected to the d(p)-latitude curve in $C_1$. Otherwise, we use the d(p)-circular curve in the medial ball of $x_1$ to transit from cell $C_0$ to $C_1$. The d(p)-latitude curve in $C_0$ is connected to the d(p)-latitude curve in $C_1$ by the d(p)-circular curve of the medial vertex $x_1$. This procedure is continued until a node t with corresponding medial point x(q) is reached.

3.4.2 Routing on Chords

The second part of the routing process starts with a node t that has the same medial point as the destination q and the same height as the source p, namely, x(t)=x(q), d(t)=d(p). If x(q) is not a medial vertex, then x(q) has only two chords. Thus either t and q are on the same chord or they are on different chords. In the first case, routing along the x(q)-longitude curve inside the cell containing q will reach the destination q. In the second case, q and t are on different cells with x(q) on the boundary. We route first along the x(q)-longitude curve to the node x(q), then follow the second chord to reach q. If x(q) is a medial vertex, then there is a local circular coordinate system around x(q), thus we route from t along the chord through t to a node t' with height d(q). Then we route from t' to q along the d(q)-circular curve in the local circular coordinate system of x(q).

In summary, the naming system provides a natural road system on which routing can be performed efficiently in a localized manner. The routing scheme guarantees delivery for any source and destination pair.

4 Medial Axis-Based Naming and Routing on Discrete Sensor Field

The previous section explains the basic idea of using the medial axis to build a naming and routing scheme for any point in a continuous geometric region. All the concepts are clear and well-defined in the continuous case. For any two points, there is a natural route indicated by the medial axis between them. The adaptation of the ideas and concepts to a discrete sensor field, however, requires non-trivial re-design of the protocol due to the following reasons. First, sensors (communication devices) in accordance with the disclosed technique don't have geographical locations. The shape of a sensor field is not known and is only approximated by the connectivity of the sensor network. Also the proximity of two sensors is only approximated by the number of hops of the shortest path on the (unweighted) communication graph. Since the hop count is always an integer, the approximate distances have non-neglectable rounding errors. This indicates more troubles to overcome since the exact medial axis is very sensitive to noises on boundaries—a small bump on the boundary will create a long branch to the medial axis.

Figure 8A:
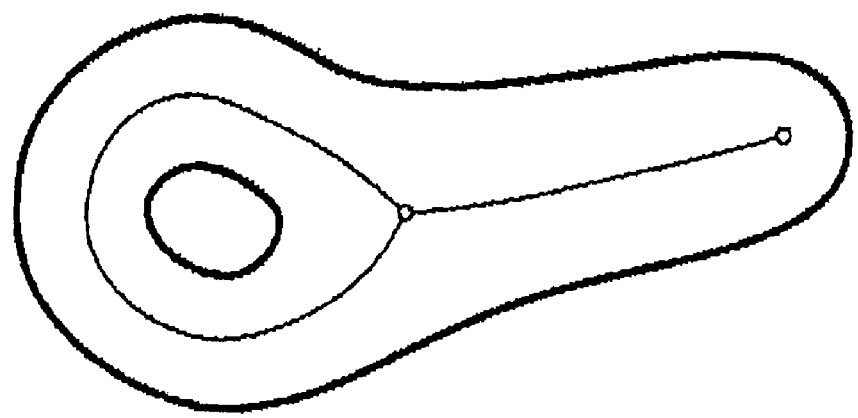
FIGS. 8(*a*), 8(*b*), 8(*c*), and 8(*d*) is a representation of a sensor network that illustrates determination of a network route in accordance with the processing illustrated in FIGS. 3-6.
Figure 8B:
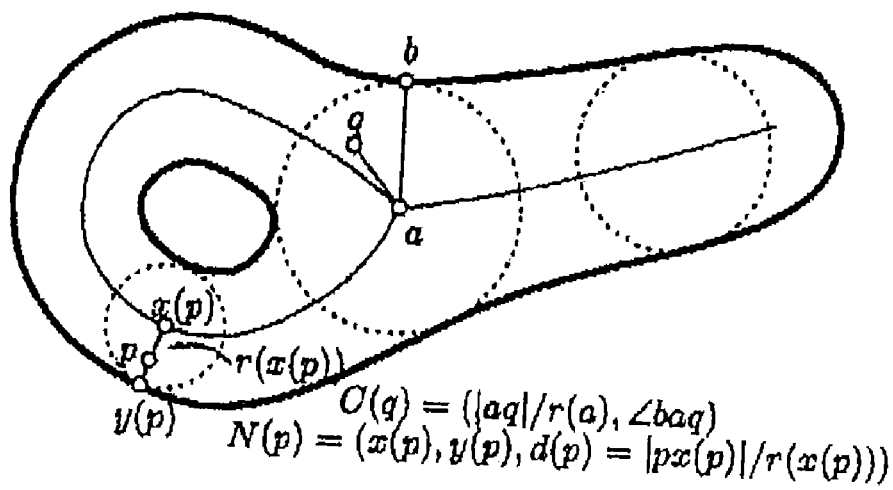
Figure 8C:
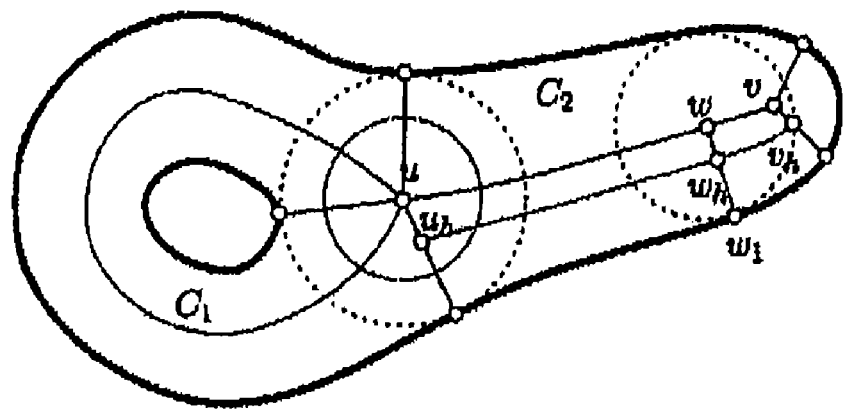
Figure 8D:
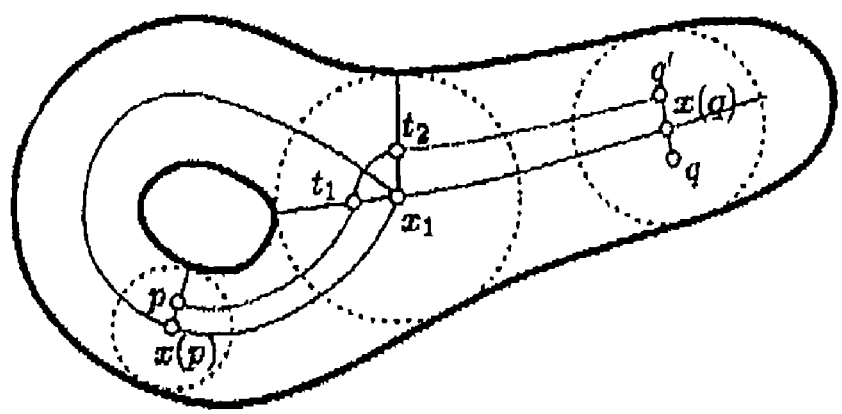

In this section, we present a protocol that overcomes all these difficulties and constructs a robust medial axis and a routing algorithm for sensor networks, where the input is only the connectivity graph (separation information) for the nodes of the sensor field. Our protocol computes a medial axis in a preprocessing step and assigns names to all the sensors with respect to the medial axis. At the end of the preprocessing, a compact representation of the medial axis, called the medial axis graph (MAG), whose size is comparable with the complexity of the geometric features of the sensor field, is stored at each node in the network. In general, the MAG is a simple graph, containing only a small number of vertices and edges (see the FIG. 13 description below, which lists the information stored at a node). For example, FIG. 8(a) shows a MAG that is similar to the MAG for the scenario in FIG. 7(e), and the MAG for the relatively complicated wireless network illustrated in FIG. 16(a) has a medial axis shown in FIG. 16(b), which has the relatively simple corresponding MAG shown in FIG. 16(d). Thus, storing the MAG in memory at each node of the wireless network does not unduly tax the resources of the communication devices. With the medial axis based naming infrastructure, routing is performed in two steps. In a global planning step, the shortest path between the medial points of the source and destination in the MAG is found. The actual routing path is realized by local gradient descent routing either by routing in parallel with the medial edges on the global planning path or on chords to the destination.

4.1 Construction of Medial Axis

The computation of the exact medial axis is only known in principle for semi-algebraic sets, yet algebraic difficulties prevent efficient implementations even for shapes bounded by simple curves in the plane. That is, each element in a semi-algebraic set is the solution of a finite system of algebraic equations and inequalities. See, for example, D. Attali et al., in *Mathematical Foundations of Scientific Visualization, Computer Graphics, and Massive Data Exploration*, Springer-Verlag (2004). In practice, an approximation to the medial axis is typically computed by using the Voronoi diagram of a dense sampling on the boundary of a shape. To be precise, an $\epsilon$-sample X of the boundary of a shape R is a finite set of points on the boundary $\partial R$ such that each point on $\partial R$ is less than distance $\epsilon$ away from a point in the $\epsilon$-sample. For a shape in $\mathbb{R}^2$, the Voronoi edges and vertices of an $\epsilon$-sample X that are completely inside the shape converge to the medial axis, when $\epsilon \to 0$. See, for example, J. W. Brandt, Convergence and continuity criteria for discrete approximations of the continuous planar skeletons, in *CVGIP: Image Understanding*, 59(1):116-124, 1994. The construction of an approximate medial axis in a sensor network uses similar ideas. We first give a quick outline of the protocol and then explain each step in detail. The Medial Axis Construction Protocol (MACP) runs as follows:

1. Detect boundaries of a sensor field;
2. Construct the medial axis graph, and broadcast it to every node in the network;
3. Name each node by only localized computation.

4.1.1 Detect Boundaries of a Sensor Field

The construction of the medial axis requires a sampling of nodes on the boundaries of the sensor field, including the outer boundary and the boundaries of interior holes. Each sample node is aware of the hole boundary or outer boundary to which it belongs. These can be realized in different ways, either by manual identification of boundary nodes during deployment, or by automatic detection of holes. In particular, there are ways to detect some samples of sensors on the boundaries of holes by only the connectivity of the network. If the sensors are deployed uniformly densely in a field with large holes, sensors on the boundaries of holes usually have much smaller sensor density and can be detected as such. See, for example, S. P. Fekete et al., in *Algorithmic Aspects of Wireless Sensor Networks: First International Workshop (ALGOSENSOR)*, pages 123-136 (2004). Recently a topological method has been proposed to mark nodes on the boundaries of holes by detecting the breakage of wave propagation contours. See, for example, S. Funke, *Topological hole detection and its applications*, submitted to MobiCom'05 (2005).

Figure 7A:
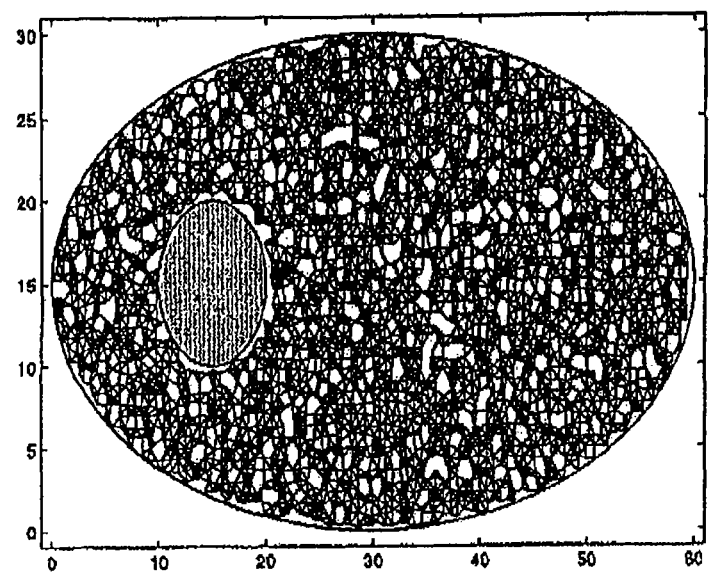
FIGS. 7(*a*), 7(*b*), 7(*c*), 7(*d*), 7(*e*), and 7(*f*) are representations of a sensor network that illustrate processing of communication devices such as illustrated in FIG. 1 in accordance with the processing illustrated in FIGS. 2-6.
Figure 7B:
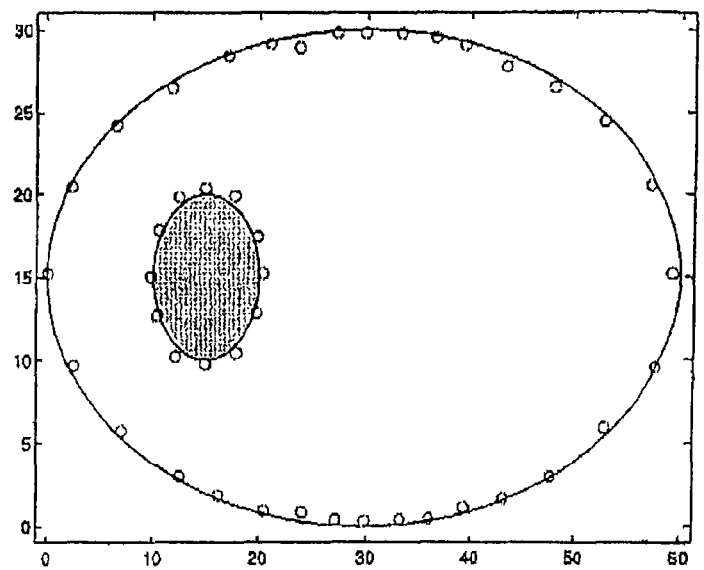
Figure 7C:
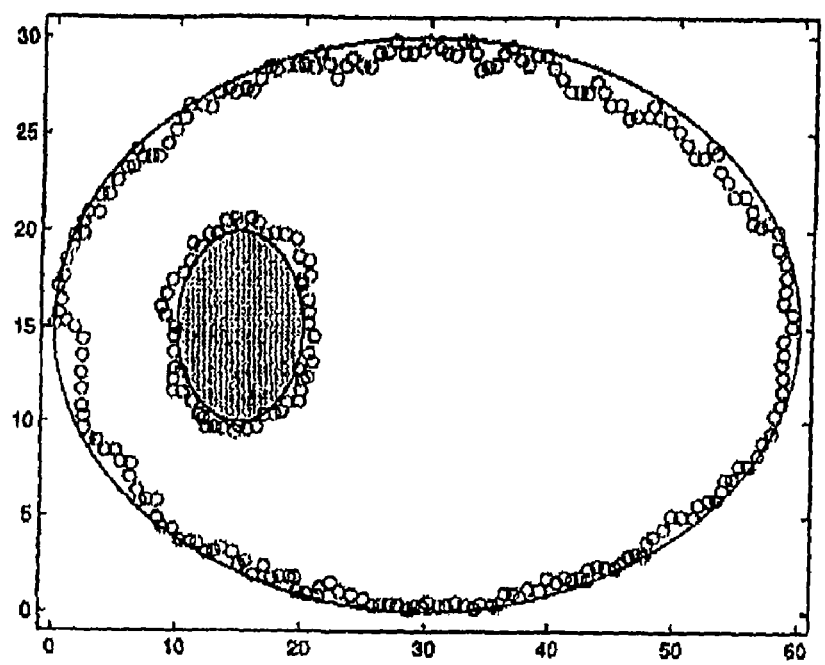
Figure 7D:
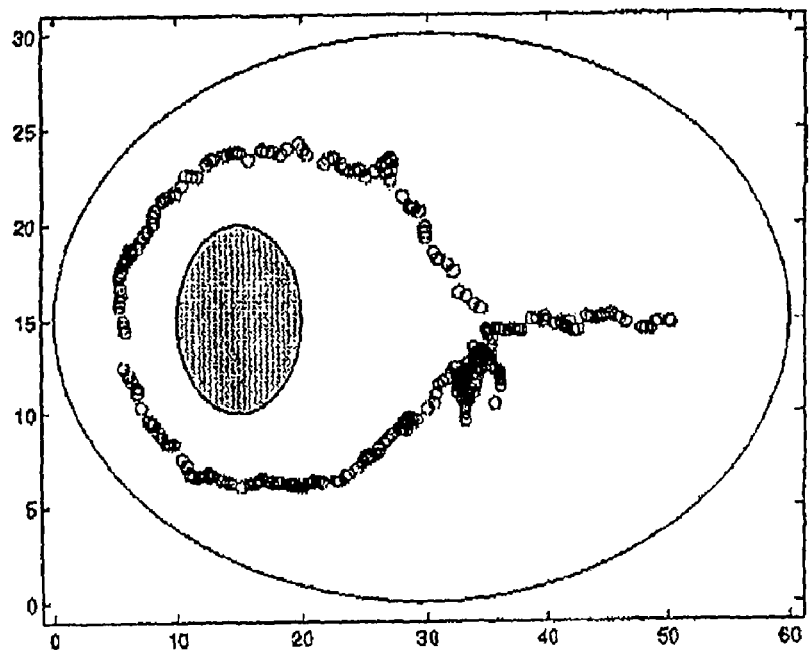
Figure 7E:
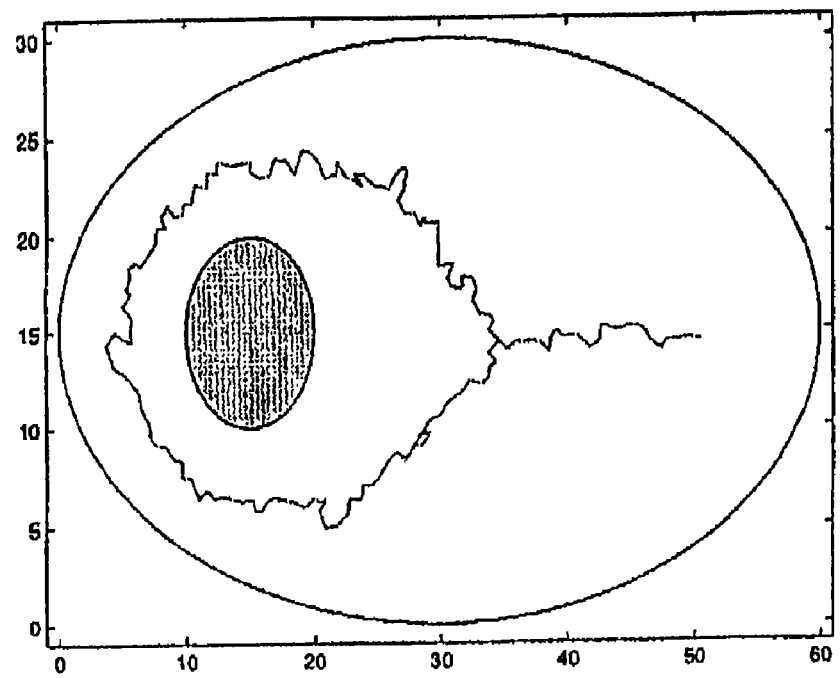
Figure 7F:
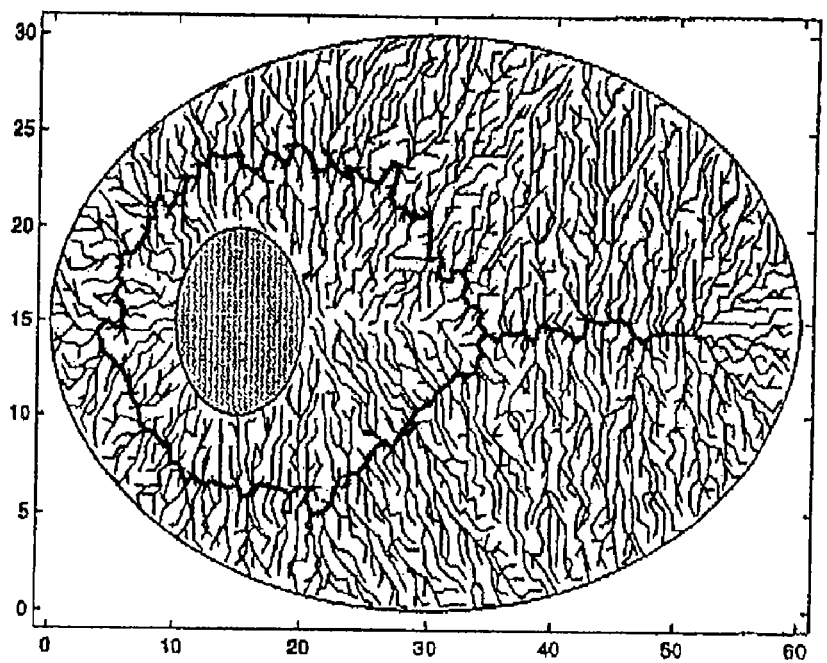

Given a reasonably dense sampling of boundary nodes, there are a number of techniques to detect the whole boundary from these samples. This problem is basically the curve construction problem, namely, connecting the sampling nodes to a meaningful boundary. One way to tackle this problem is to apply the Crust algorithm to discrete networks. See, for example, N. Amenta et al., *Graphical Models and Image Processing*, 60:125-135 (1998); N. Amenta et al., *Comput. Geom. Theory Appl.*, 19:127-153 (2001). In practice, a simple and effective algorithm is to ask the close-by sample nodes to discover each other through local flooding, and include all the nodes on the shortest paths between them as new boundary nodes. Such detection can be executed by different nodes simultaneously and is timely efficient. The boundary nodes in FIG. 7(c) were detected in this way from the samples as shown in FIG. 7(b).

4.1.2 Construct the Medial Axis Graph

For a communication network represented by an unweighted graph G=(V, E) and a subset $S \subseteq V$ on the boundaries of the sensor network, we define a node to be on the medial axis if it has equal hop counts to two boundary nodes. This node is called a medial node. The medial axis in the discrete case is defined as the subgraph $G_M \subseteq G$ spanned by the medial nodes M.

The medial nodes defined above are noisy. It is known that in the continuous case the medial axis is sensitive to noise on boundaries. In particular, a small bump on the boundary can incur a long branch on the medial axis. This instability is more severe for a discrete network. For example, all the nodes that are one-hop away from two boundary nodes are medial nodes by the definition, which are clearly undesirable. Similarly, a node that has equal distance to two close-by nodes on the same boundary is also unwanted. So we want to eliminate the unstable branches on the medial axis and keep those that correspond to genuine geometric features. In particular, we disregard those unstable medial nodes whose closest boundary nodes are on the same boundary and are within a small distance.

Medial nodes can be identified through flooding. Specifically, nodes on the same boundary flood as one "super" node. As a result, each node learns its nearest boundary node(s) and can determine if it is a medial node or not. Unstable medial nodes are ignored. See FIG. 7(d) for an example. However, it might be the case that the middle point of an edge has equal distance to two or more boundary nodes. In this case, we arbitrarily round it to an endpoint of the edge. We classify medial nodes into two types, type I and type II. A medial node u of type I has equal distances (in hops) to two or more nodes on different boundaries. We call these boundaries the closest boundaries of u. All the other medial nodes are of type II.

An important step in the construction of the medial axis is to guarantee it is connected in the correct way. For the continuous case, the medial axis inside the geometric region is connected with each minimal cycle surrounding exactly one obstacle. Our construction is based on this observation and that the discrete sensor field is a reasonably good approximation of the underlying shape. For two boundaries i and j, if there exists a set of medial nodes of type I whose closest boundaries include i,j, we connect them into a short path $P_{ij}$ and include all the nodes on this path in the medial axis. For any boundary i, we connect the paths $P_{ij}$, for all j, into a cycle. Two endpoints of different paths are called adjacent, if they are connected on some cycle. For k endpoints $a_1, a_2, \ldots, a_k$, $k \geq 3$, respectively on different paths $P_1, P_2, \ldots, P_k$, if $a_i$ and $a_{30\ 1}$ are adjacent, for i=1, ... k-1, then we use a star-like tree to connect them. We denote the root of the tree as a medial vertex of the medial axis graph. All of these operations can be implemented by a very small flooding in a local neighborhood in a progressive manner. Nearby medial nodes connect themselves into paths. Nearby paths connect themselves into cycles or by a tree rooted at medial vertices. Similarly, we use limited flooding to connect all type-II medial nodes into paths. These paths and the type-I cycles are connected by star-like trees into one connected piece. Finally we trim away short branches which may be caused by noises on the boundaries and are of no help for routing. Now the medial axis is composed of a number of cycles and paths nicely glued together. All the medial nodes with degree one or more than three are medial vertices.

The medial axis constructed in this way includes all the medial nodes and a set of edges that connect them in a meaningful way. See FIG. 7(e) for an example. The medial axis captures the geometric shape and topological properties of a sensor network. The medial axis is stored locally on the medial nodes. A compact representation of the medial axis is made available to every sensor in the network. Specifically, we use the medial axis graph (MAG) as a combinatorial representation of the medial axis. The set of vertices of the MAG is the set of medial vertices. Each path between two medial vertices in the medial axis corresponds to an edge in the MAG. The edges in the MAG are weighted by the number of hops of the corresponding path in the medial axis. The MAG is very compact. The size of the MAG is only proportional to the number of large geometric and topological features of the sensor field. For example, the MAG for the scenario in FIG. 7(e) has only two vertices and two edges (one of them is a self-loop). The MAG for the scenario in FIG. 16 has only eighteen vertices and twenty-seven edges. Thus we can afford to let every sensor keep such a compact graph.

After the construction of the medial axis, we let a node flood the network, pull the information about the medial axis, and construct an abstracted medial axis graph. This graph is then broadcast to every sensor. The full medial axis is stored locally on the medial nodes. Namely, each medial node remembers its neighboring edges on the medial axis and remembers which medial edge in the MAG it is on and how many hops it is from each endpoint of the medial edge.

4.1.3 Assign Names to Sensors

The medial axis of a sensor network is used as a reference to name every sensor node. We start from the medial axis and progressively compute the closest medial node for each sensor. This computation naturally establishes a shortest path forest rooted at the medial axis. Consider a medial node v on the interior of a medial path. Since v has two closest nodes on the boundary, v has at most two shortest path trees rooted at itself, one on each side of the medial edge. Recall that each node knows its closest boundary and can decide which side of the medial edge it stays on. Therefore, for each child u of v with a shortest path subtree T(u), we perform a majority vote to assign T(u) to the side on which most of the nodes in T(u) agree. The nodes on the shortest path tree on one side of the medial edge are assigned positive height values. The nodes on the other side of the medial edge are assigned negative height values.

Each node is given a name by its relative position to the medial axis. Basically each node v is assigned an x-range [l(v), r(v)] and a height h(v), where the x-range specifies to which part of the medial axis v corresponds, and the height specifies how far v is from the medial axis. In the medial axis graph, a medial edge actually corresponds to a medial axis path in the sensor network. Suppose the medial path has in total k nodes. Then the j-th node on the path is assigned an x-range [j=1,j] and a height value 0.

Figure 11:
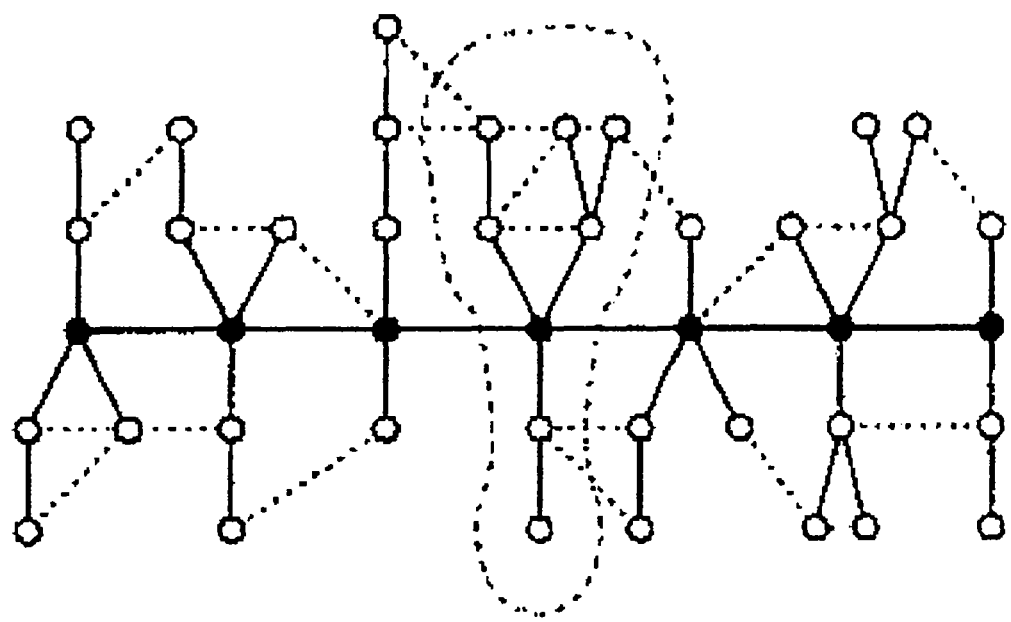
FIG. 11 is a representation of processing for specifying node location in the wireless network of FIG. 1.

FIG. 11 shows an example of naming, where each node is assigned a name with respect to the medial axis. In FIG. 11, the medial axis is drawn in thick horizontal line. Nodes on the medial axis are represented by solid circle. Black solid edges represent the balanced shortest path trees rooted at nodes on medial axis. The communication edges that are not tree edges are drawn in dotted line segments. The part bounded by the dashed curve is two shortest path trees rooted at a medial node, one on each side of the medial edge.

Figure 12:
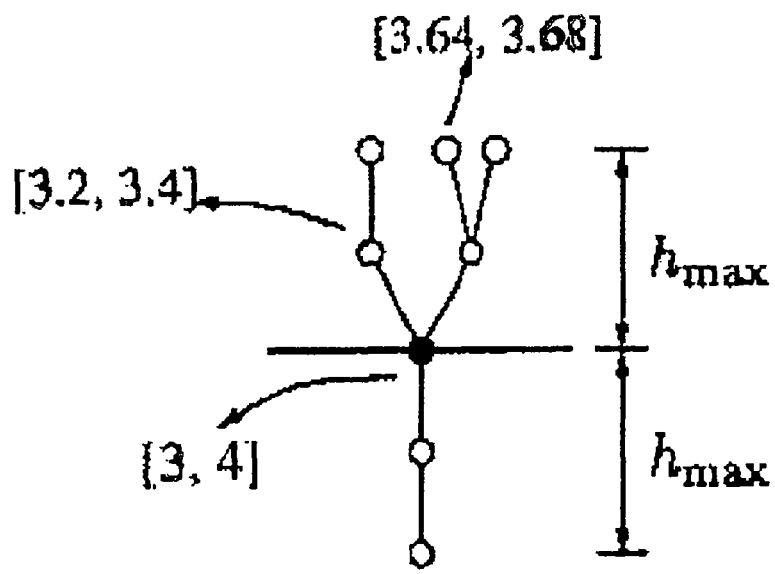
FIG. 12 is a representation of processing for specifying node location in the wireless network with respect to the medial axis.

Now we focus on naming the nodes in the same shortest path tree. The assignment of names starts from the root, a node on the medial axis, and propagates down its shortest path tree. See FIG. 12 as an example. Suppose a node v is given a name with an x-range [l(v), r(v)] and a height h(v), Suppose v has k children. Then we uniformly partition the x-range of v into 2k+1 subintervals and assign one to each children. See FIG. 12, which shows the assignment of a name to each node with respect to the medial axis. It should be noted that the collection of x-ranges of v's children does not fully cover the x-range of v. The purpose of these gaps is for easy node insertion and deletion, as will be described in Section 4.3 below. The maximum height of the shortest path tree on a medial node v is stretched to $h_{max}$. Thus a node w that is k hops away from its root v is assigned a height value of h(w) with $|h(w)|=h_{max}k/m$, where m is the height of the shortest path tree at v. The sign of h(w) depends on which side of the medial edge the shortest path tree containing w stays.

A medial vertex v may stay on more than one medial edges. In this case, it is assigned a name with respect to each medial edge it stays on. For each medial edge, v has two shortest path trees rooted at itself. We denote by T(v) the collection of all the shortest path trees rooted at v. We assign circular coordinates to the nodes on the shortest path tree T(v) with root v in a way very similar to what we explained above. Specifically, the root v is given a circular coordinate with an angular range $[0, 2\pi]$ and a radius 0. For a node u, its angular range is divided by 2k+1 small intervals if u has k children. Each child is assigned one subinterval. The maximum radius of the nodes in the tree is stretched up to $h_{max}$. As in the case above, each node in the tree T(v) is assigned a radius according to how far it is from the root.

Figures 13, 14:
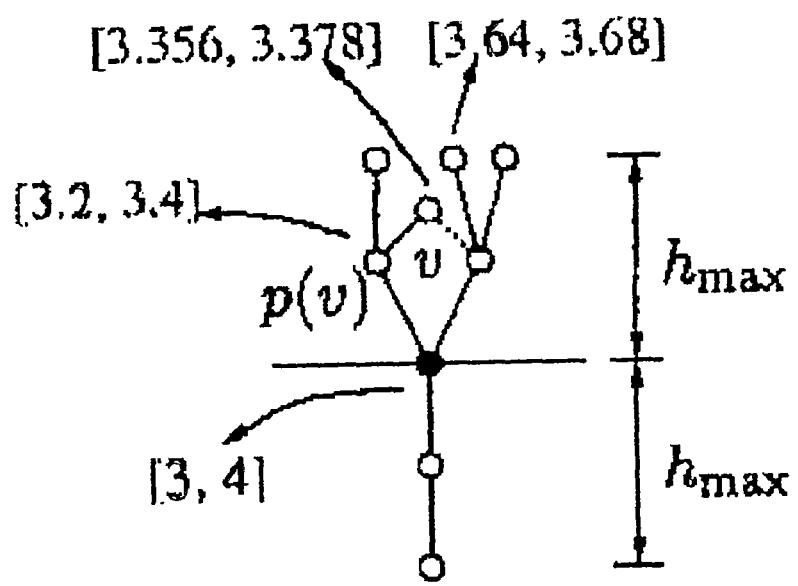
FIG. 13 is an illustration of the information stored at a communication device such as illustrated in FIG. 2.
FIG. 14 is a representation of processing for adding a new node to the sensor network illustrated in FIG. 1.

To summarize, by the Medial Axis Construction Protocol, we construct a medial axis and its compact representation MAG, together with shortest paths forest rooted at medial axis nodes. Each node in the sensor network only stores a small amount of information, namely, information about its one-hop neighbors and a small size medial axis graph. FIG. 13 is a representation of the information stored in memory at a node. Thus, the memory of each communication device in the wireless network includes data comprising (1) the medial axis graph for the wireless network; (2) the names (tuples) of itself and its one-hop network neighbors; (3) a bit to record if the communication device is a node on the medial axis; and (4) the names of the neighboring medial axis nodes.

4.2 Medial Axis Based Routing

Our MAP routing scheme uses the network node names of the source node and the destination node. A source node can obtain the name of the destination node in several ways. If the source knows the ID of the destination, we can use a scalable location service to provide the ID-name correspondence for each sensor. See, for example, J. Li et al., in *Proceedings of 6th ACM/IEEE International Conference on Mobile Computing and Networking*, pages 120-130 (2000). A source node can also specify the name of the destination directly, since our naming scheme has an intuitive meaning. For applications such as content-based distributed hash table, sensors can hash data to a reservoir for a query to fetch. In this case, the source gets the name of the destination from the output of a hash function.

With the medial axis based naming infrastructure, the Medial Axis based Routing Protocol (MARP) runs as follows;

1. In the global planning step, find the shortest path $S_A(x(p), x(q))$ on the medial axis graph A for the medial points of source p and destination q;
2. Route in parallel with $S_A(x(p), x(q))$ until a node with the same medial point as the destination q is reached;
3. Route along chords and/or circular curves to reach the destination q.

The global planning step is performed at the source node by a shortest path algorithm on the MAG. In the following we'll focus on the medial-axis based greedy routing in the sensor network. The basic idea is the same as in the continuous case. The reference path on the medial axis, $S_A(x(p), x(q))$, is partitioned into segments by medial vertices. Suppose we are currently at a node v whose corresponding medial point stays on a medial edge $x_i x_{i+1}$, $1 \leq i \leq k-1$, with $x_i$ as a medial vertex, $x_1 = x(p)$, $x_k = x(q)$. We hope to route in parallel with $x_i x_{i+1}$. For this purpose, we set a temporary goal as the node whose corresponding medial point is $x_{i+1}$ and absolute height value is $|h(p)|$. When we reach a node whose corresponding medial point is already the next medial vertex $x_{i+1}$, we change our temporary goal accordingly. Namely, if we reach a node that stays on one of the shortest path tree rooted at $x_{i+1}$ that belongs to the medial edge $x_{i+1} x_{i+2}$, we route in parallel with $x_{i+1} x_{-2}$ as the next step. If we reach a node w with $x_{i+1}$ as its corresponding medial point, but w stays on a shortest path tree that doesn't belong to the next medial edge $x_{i+1} x_{i+2}$ (v has multiple shortest path trees belonging to different medial edges), we route in the circular coordinate system of v to reach a temporary goal on a shortest path tree of our desired medial edge.

Now we focus on how to route greedily towards the temporary goal in a coordinate system with x-coordinate and height value. We have a number of local routing rules for a node to select the next hop. At each hop we test the following routing rules sequentially on one-hop neighbors and follow the first satisfied rule.

1. If the x-range of v overlaps with the x-range of $x_{i+1}$, then v's corresponding medial node is $x_{i+1}$. We then proceed to the next temporary goal.
2. If v has a one-hop neighbor w whose corresponding medial point stays on the next medial edge $x_{i+1} x_{i+2}$, then go to w and switch to the next temporary goal;
3. If v has a one-hop neighbor w, and w is "closer" to our temporary goal than v, then specifically, w has the following properties:

$r(w) \leq r(v)$, if the x-range of v, $[l(v), r(v)]$ is smaller than that of $x_{i+1}$, $[l(x_{i+1}), r(x_{i+1})]$; and $l(w) \leq l(v)$ otherwise;

v, w are on the same side of the medial edge, i.e., they have the same sign;

w is not a descendent of v;

and $(r(w) - l(x_{i+1}))^2 + (h(w) - h(p))^2 < (r(v) - l(x_{i+1}))^2 + (h(v) - h(p))^2$, if the x-range of v, $[l(v), r(v)]$ is smaller than that of $x_{i+1}$, $[l(x_{i+1}), r(x_{i+1})]$; and $(l(w) - r(x_{i+1}))^2 + (h(w) - h(p))^2 < (l(v) - r(x_{i+1}))^2 + (h(v) - h(p))^2$ otherwise;

then go to w;
4. Go to v's parent.

By the MAP naming scheme and the above routing rules, a node v never goes to a node w such that w's projection on the medial axis is further away from $x_{i+1}$ than that of v. That says, we never route backward along the medial edge. Secondly, we never get stuck at a node by the routing rule. If v is not on the medial axis and v can not progress towards the temporary goal, v can always go to its parent. If v is on the medial axis, v must have a neighbor who is closer to the destination than is v.

These routing rules are for routing inside a canonical cell under the Cartesian coordinates of x and height h. Routing under the circular coordinates are just the same, except that in the above rules we use angular coordinates in replace of the x-coordinates.

At the final stage, we have reached a node v whose corresponding medial node is the same as that of the destination node q. Then we route towards the destination node on the shortest path tree of x(q). Again this can be performed by using only the one-hop neighbor information and the name of the destination node.

An optional modification to the algorithm that can improve the performance of MAP is to keep a very small routing table, e.g., neighbor nodes within three hops, at each node. This is because the virtual coordinates (that is, the network node names) generated by the MAP technique may have a slight mismatch with the real co-ordinates and the communication graph. By using a 3-hop routing table, a node has more possibility to proceed greedily towards its (temporary) goal. This will also improve load balancing since there are even fewer chances that a node has to go towards the medial axis.

In summary, by the MAP routing protocol a source performs a global path planning in the very compact medial axis graph, and local greedy routing hop-by-hop guided by the globally planned path on MAG. Delivery is guaranteed since a packet never gets stuck in the middle.

4.3 Network Dynamics

In a sensor network, links may come and go, nodes may be inserted and deleted. Our MAP naming and routing scheme can efficiently handle such dynamics such that only local changes are necessary.

Figure 15:
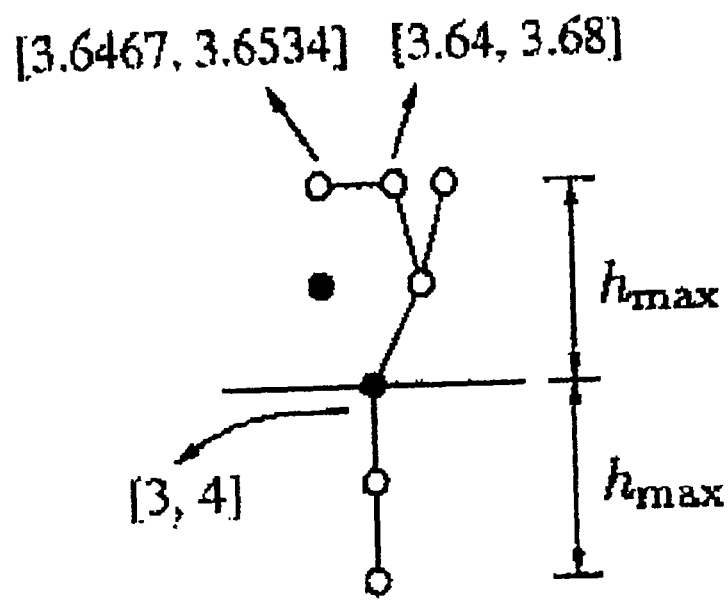
FIG. 15 is a representation of processing for deleting a node from the sensor network illustrated in FIG. 1.

FIG. 14 and FIG. 15 illustrate how these changes are handled. Namely, when a new node v is inserted into the network, the node v does a local broadcasting operation to find its one-hop neighbors. Then v is connected to the shortest-path-forest of the medial axis node by choosing its parent as its one-hop neighbor with smallest hop distance to the medial axis. Then v finds a gap on the x-coordinate range of its parent p(v). In FIG. 14, v finds a gap [3.334, 3.4], partitions the gap equally into three sub-intervals and stays on one of them, say [3.356, 3, 378]. The x-coordinate ranges of all the other children of p(v) are not affected. If p(v) is of k hops away from the medial axis, v is of k+1 hops away. The height value of v is assigned according to its parent p(v). Namely, $$h(v) = \frac{k+1}{k} \cdot h(p(v)).$$

FIG. 14 shows that if a new node is added to the sensor network, we connect it to the shortest-path tree of a node on the medial axis and assign it a name.

When a node v is deleted from the network, we do nothing if v is a leaf on the shortest path tree to the medial axis. If v has descendants, then we connect their descendants to the shortest path trees through other nodes, in the same way as the node insertion scenario. If v also stays on the medial axis, its neighbors on the medial axis initiate a local flooding to find each other and include all the nodes that stay on their shortest paths in the medial axis. Then new names are assigned to these nodes involved in the update.

FIG. 15 shows that if a node (in solid line) is deleted from the sensor network, its descendants find links to other parts of the tree and are assigned new names.

If a link between two nodes appears, nothing is changed. If a link between two nodes disappears, we do nothing as long as the link is neither a link between a node u and its parent on u's shortest path tree, nor a link on the medial axis. If a link on the medial axis disappears, two medial nodes connect themselves by their shortest path and includes the nodes on this path to the medial axis. If a link between a node u and its parent disappears, then we may need to assign a new name to u. Similarly, the node u finds among its one-hop neighbors the neighbor with the smallest hop distance to the medial axis as its new parent. When the new parent of u is identified, u's name is updated, and u's descendent, if it exists, updates its name accordingly.

5 Simulations

Figure 16A:
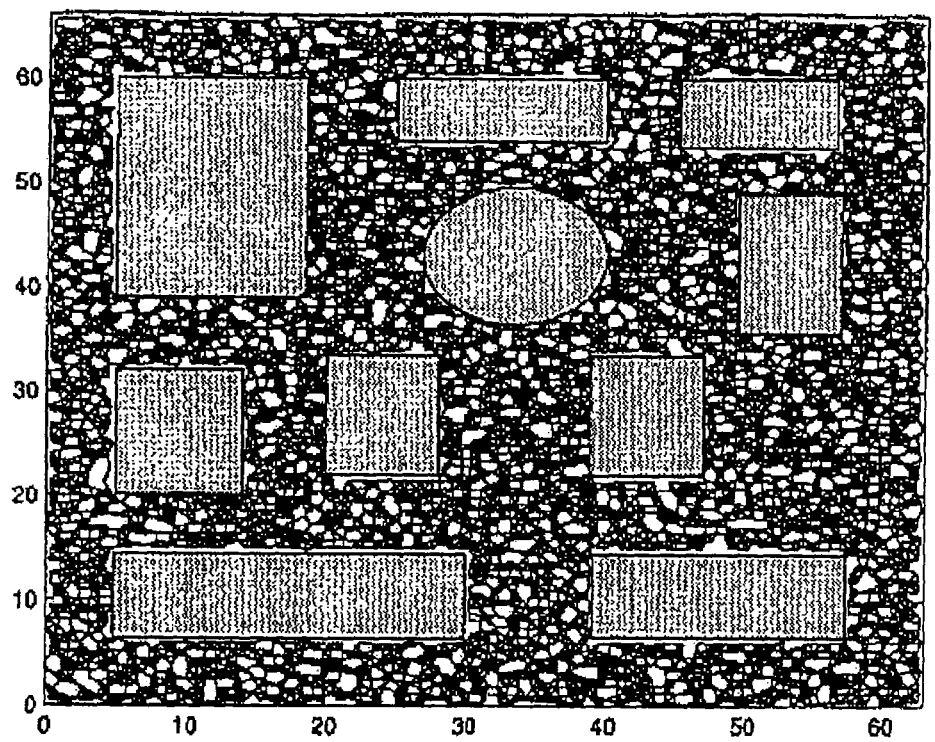
FIGS. 16(a), 16(b), 16(c), and 16(d) illustrate processing in accordance with the invention for a simulated sensor network at a university campus.
Figure 16B:
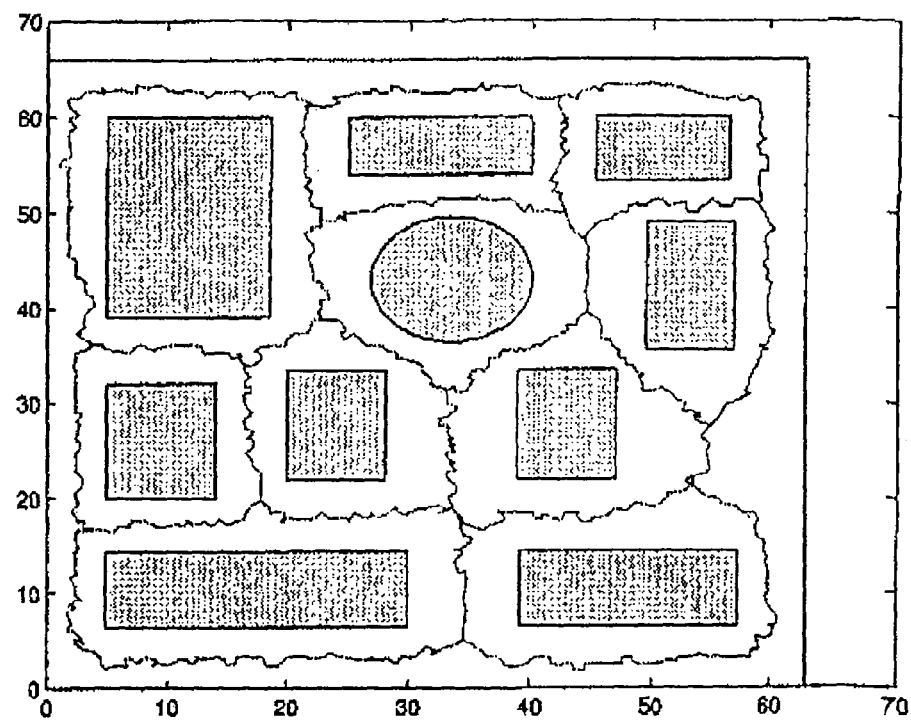
Figure 16C:
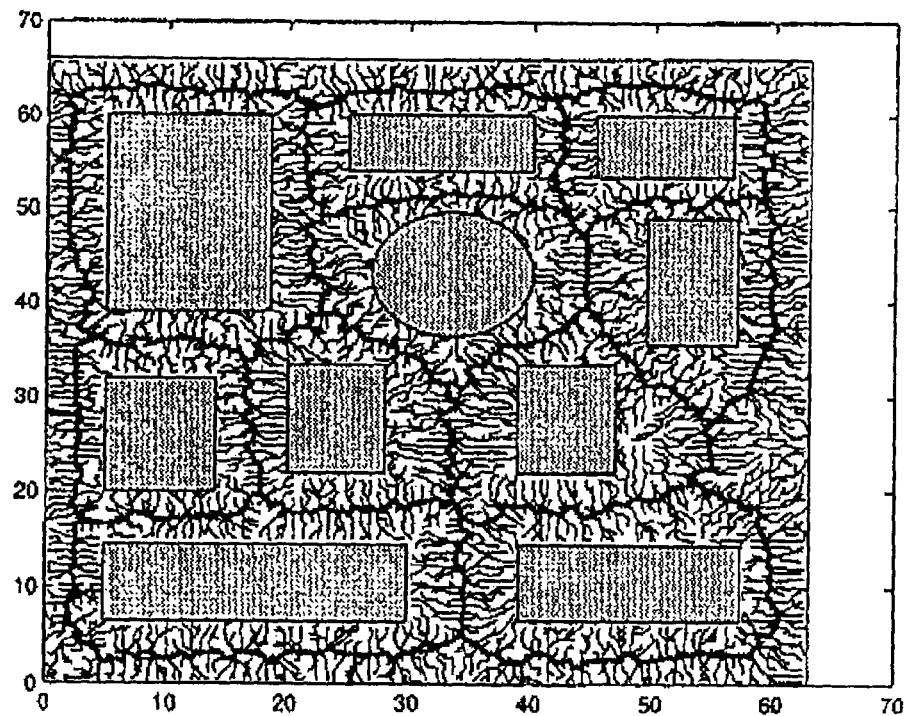
Figure 16D:
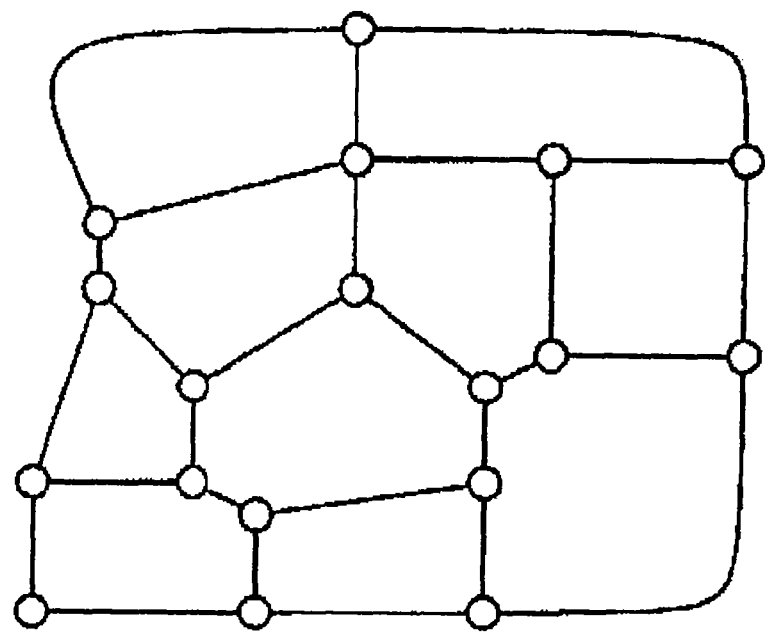
Figure 17A:
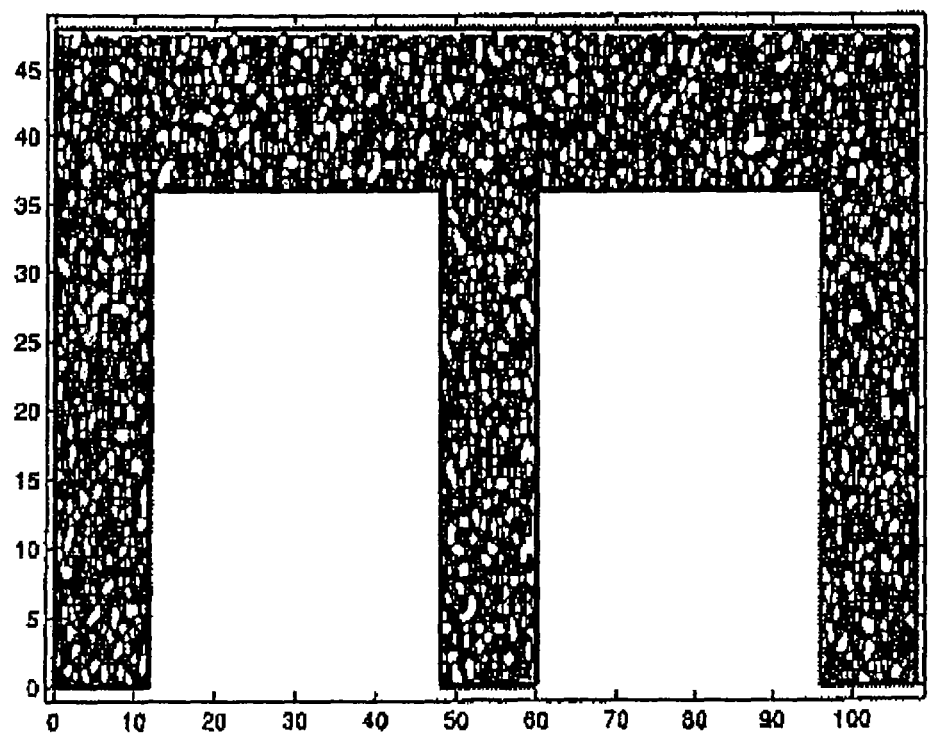
FIGS. 17(a) and 17(b) illustrate processing in accordance with the invention for a simulated sensor network at an airport.
Figure 17B:
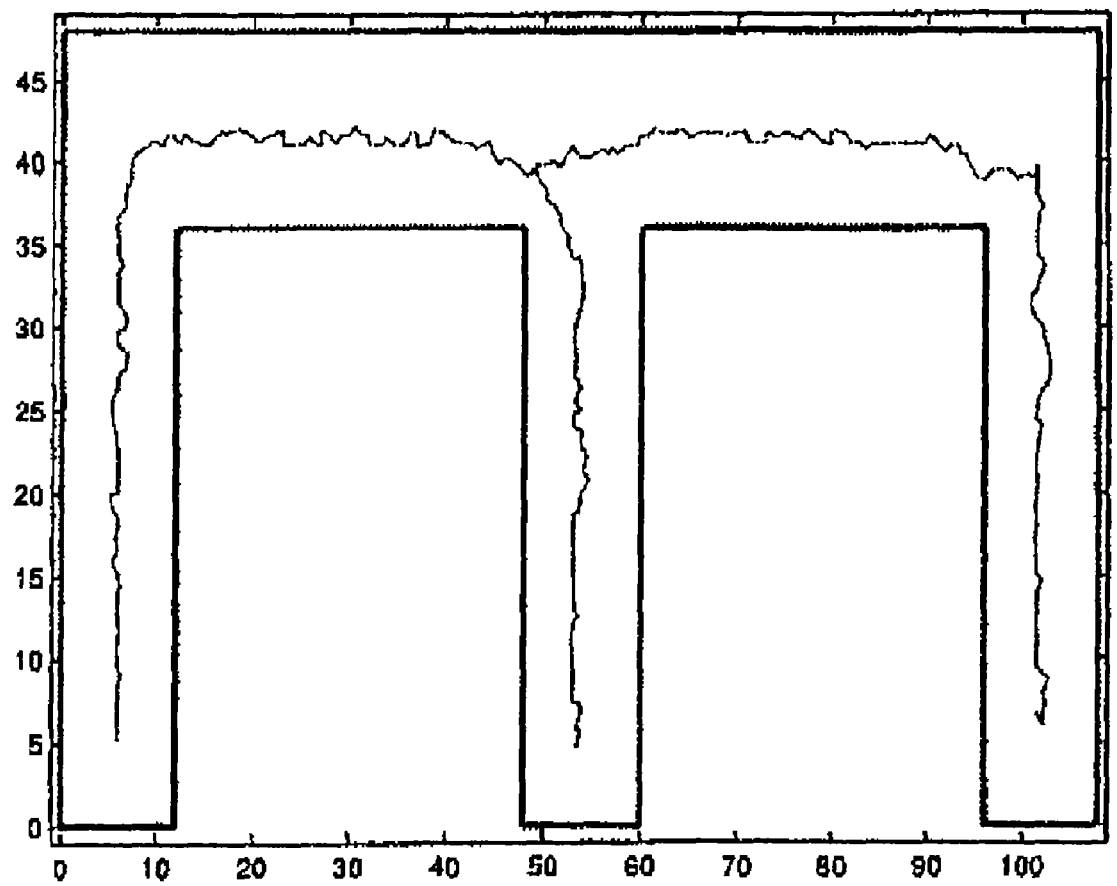

We have implemented a MAP protocol and conducted extensive simulations for various types of environments. In this section we introduce two experiments for sensor networks deployed in a university campus and airport terminals. The university campus is a typical outdoor environment, as shown in FIG. 16, while airport terminals are representative of indoor scenarios, as shown in FIG. 17. Both of them have complex geometry and/or non-trivial topology. FIG. 16 shows a scenario of a university campus. Each sensor has a communication radius of (1). FIG. 16(a) shows a sensor network of 5735 nodes deployed on a campus; FIG. 16(b) shows the medial axis of the sensor network; FIG. 16(c) shows the shortest path forest rooted on medial nodes; and FIG. 16(d) shows the medial axis graph (MAG) that is stored at each sensor. FIG. 17 shows a scenario of airport terminals, where each sensor has a communication radius of (1). In FIG. 17(a), a sensor network of 5735 nodes is illustrated; in FIG. 17(b) the medial axis of the network is illustrated.

The university campus has a 620 m by 650 m rectangle as an outer boundary and ten buildings inside. We deployed n (n=5735 in FIG. 16) sensors, each of which has a coverage radius of 10 meters. The sensors were deployed with a grid model with perturbation. Each sensor deviates from its grid position with a normal distribution with standard deviation $\sigma$=2 meters. We use the unit disk graph on the sensors as the graph model. We note that the communication graphs used in the experiments are actually quite sparse. The average degree of the communication graph is only 5.4067 in FIG. 16.

The airport terminals have maximum x-span of 1080 meters and y-span of 480 meters. It consists of three terminals that are connected by a corridor. We deployed n (n=5204 in FIG. 17) sensors, each of which has a coverage radius of 10 meters. Again the sensors were deployed with the same grid model with perturbation as before. The average degree of the communication graph is 5.4502 in FIG. 17.

In these experiments, we focus on the topological level of the MAP protocol. We study its routing performance, load balancing as well as its robustness to network models. We compared it with a geographic location-based routing protocol GPSR. See, for example, B. Karp and H. Kung, *In Proc. of the ACM/IEEE International Conference on Mobile Computing and Networking (MobiCom)*, pages 243-254 (2000). GPSR makes routing decisions based on geographical location information. It has two routing modes. In a greedy mode, a node routes the message to a one-hop neighbor whose geographical location (2D Euclidean coordinate in this ease) is closest to the destination. If a node has no neighbors closer to the destination than it does, it enters the perimeter routing mode. The packet is then routed by the "right-hand rule" along the face of a planar subgraph such as Gabriel Graph (GG), Relative Neighborhood Graph (RNG) until it reaches a node where greedy routing can be performed again. In our simulation, we use the restricted Delaunay Graph (RDG) as the underlying planar subgraph. See, for example, J. Gao et al., In *Proceedings of the 2nd ACM Symposium on Mobile Ad Hoc Networking and Computing (MobiHoc'01)*, pages 45-55 (2001). The restricted Delaunay graph is a planar subgraph of a unit disk graph for a set of points in the Euclidean plane. A RDG is a graph spanner, i.e., the shortest path on RDG is at most a small constant factor of that on the original communication graph. However, both GG and RNG in the original GPSR protocol are not graph spanners. It has been shown that GPSR based on RDG produces shorter paths than GPSR on other non-spanner graphs such as GG or RNG, especially in the perimeter mode. See, for example, J. Gao et al., In *Proceedings of the 2nd ACM Symposium on Mobile Ad Hoc Networking and Computing (MobiHoc'01)*, pages 45-55 (2001).

5.1 Quality of Routing Paths and Load Balancing

We measure the quality of routing paths in two ways, i.e., the number of hops and the total Euclidean length of the routing paths. We randomly pick 12000 source and destination pairs uniformly. Each experiment was performed 50 times. The data shown in Table 1 are averaged over 50 experiments.

TABLE 1

| | routing on campus | | | | routing in airport terminals | | | |
|---|---|---|---|---|---|---|---|---|
| | ratio of hops | ratio of total hops | ratio of lengths | ratio of total lengths | ratio of hops | ratio of total hops | ratio of lengths | ratio of total lengths |
| n = 5000 | 1.0859 | 0.9308 | 1.1210 | 0.9827 | 1.2276 | 0.9187 | 1.2527 | 0.9727 |
| n = 5500 | 1.0742 | 0.9223 | 1.1137 | 0.9691 | 1.2282 | 0.9317 | 1.2613 | 0.9784 |
| n = 6000 | 1.0745 | 0.9126 | 1.0987 | 0.9608 | 1.2395 | 0.9372 | 1.2791 | 0.9851 |
| n = 6500 | 1.0648 | 0.9204 | 1.1081 | 0.9519 | 1.2383 | 0.9399 | 1.2681 | 0.9861 |
| n = 7000 | 1.0705 | 0.9176 | 1.0980 | 0.9565 | 1.2388 | 0.9496 | 1.2643 | 0.9846 |
| | weighted ratio of hops | weighted ratio of total hops | weighted ratio of lengths | weighted ratio of total lengths | weighted ratio of hops | weighted ratio of total hops | weighted ratio of lengths | weighted ratio of total lengths |
| n = 5000 | 0.6685 | 0.6051 | 0.7191 | 0.6165 | 0.5655 | 0.4152 | 0.5648 | 0.4620 |
| n = 5500 | 0.6581 | 0.5932 | 0.7186 | 0.6096 | 0.5489 | 0.4066 | 0.5641 | 0.4444 |
| n = 6000 | 0.6417 | 0.5791 | 0.7011 | 0.5966 | 0.5435 | 0.4062 | 0.5616 | 0.4292 |
| n = 6500 | 0.6580 | 0.5743 | 0.6994 | 0.5904 | 0.5375 | 0.3988 | 0.5629 | 0.4287 |
| n = 7000 | 0.6510 | 0.5772 | 0.7162 | 0.5964 | 0.5425 | 0.4004 | 0.5445 | 0.4273 |

Table 1 shows the performance of routing on a university campus and airport terminals. Each result was averaged over fifty experiments. In each experiment we took 12000 source and destination pairs uniformly randomly.

For the ith source and destination pair, we denote by $h_i$ and $H_i$ the numbers of hops of the routing paths produced by MAP and GPSR. And we denote by $l_i$ and $L_i$ the Euclidean lengths of the routing paths produced by MAP and GPSR. In both Table 1, the first column, ratio of hops, is defined as $$\frac{1}{N}\sum_{i=1}^{N} h_i/H_i,$$

where N is the total number of source/destination pairs. Similarly, the third column, ratio of length, is defined as $$\frac{1}{N}\sum_{i=1}^{N} l_i/L_i.$$

The ratio of total hops and ratio of total lengths are defined as $$\frac{\sum_i h_i}{\sum_i H_i} \text{ and } \frac{\sum_i l_i}{\sum_i L_i}$$

respectively.

Figure 18A:
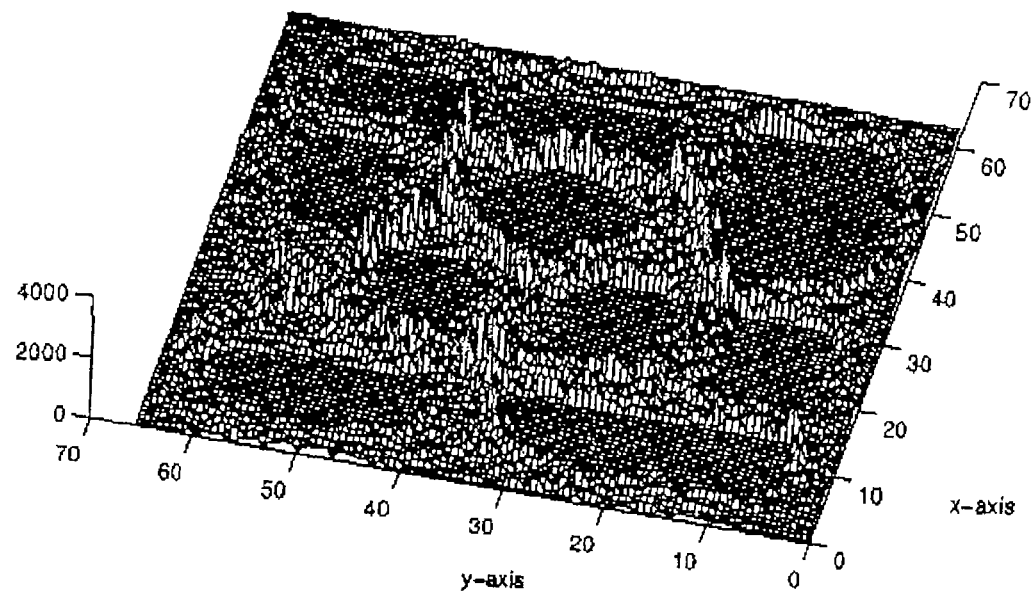
FIGS. 18(a) and 18(b) are illustrations of load balancing performance of a protocol in accordance with the invention and in accordance with the GPSR technique.
Figure 18B:
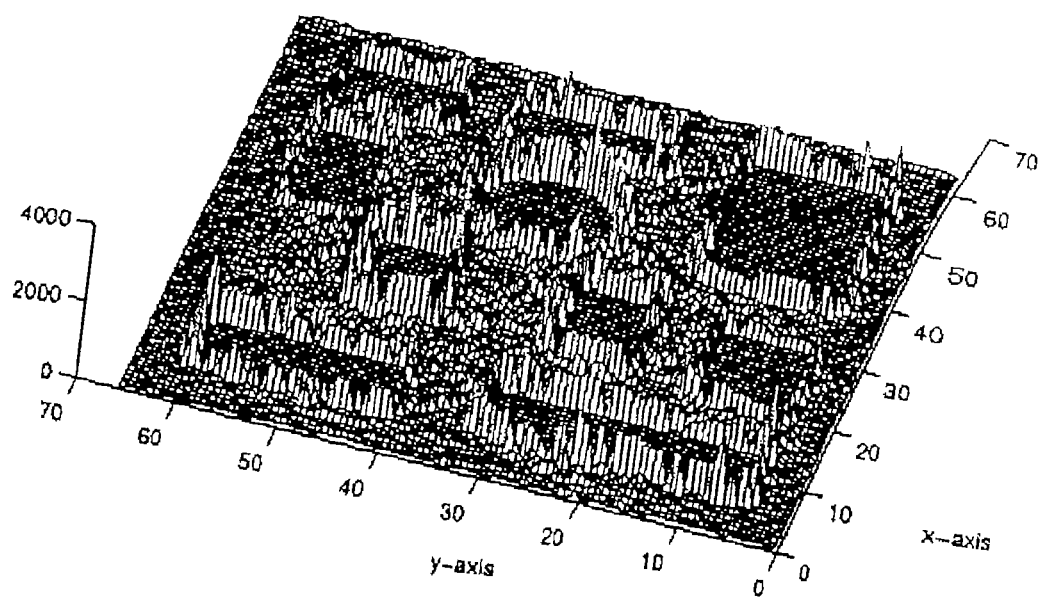
Figure 19A:
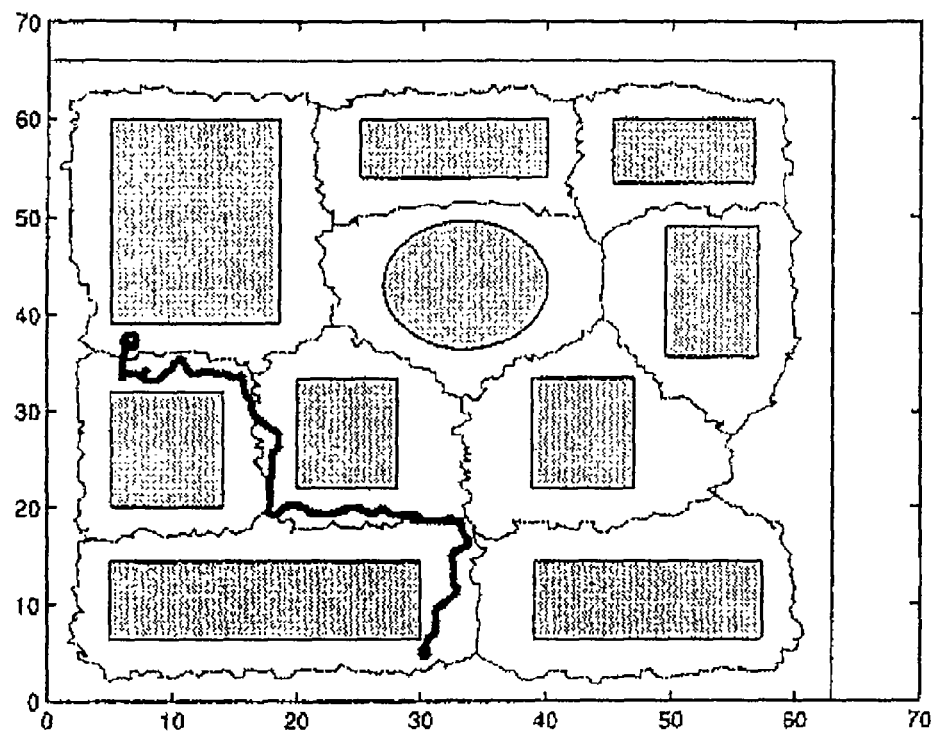
FIGS. 19(a), 19(b), 19(c), and 19(d) illustrate a comparison of routing paths generated by the disclosed protocol and the GPSR technique.
Figure 19B:
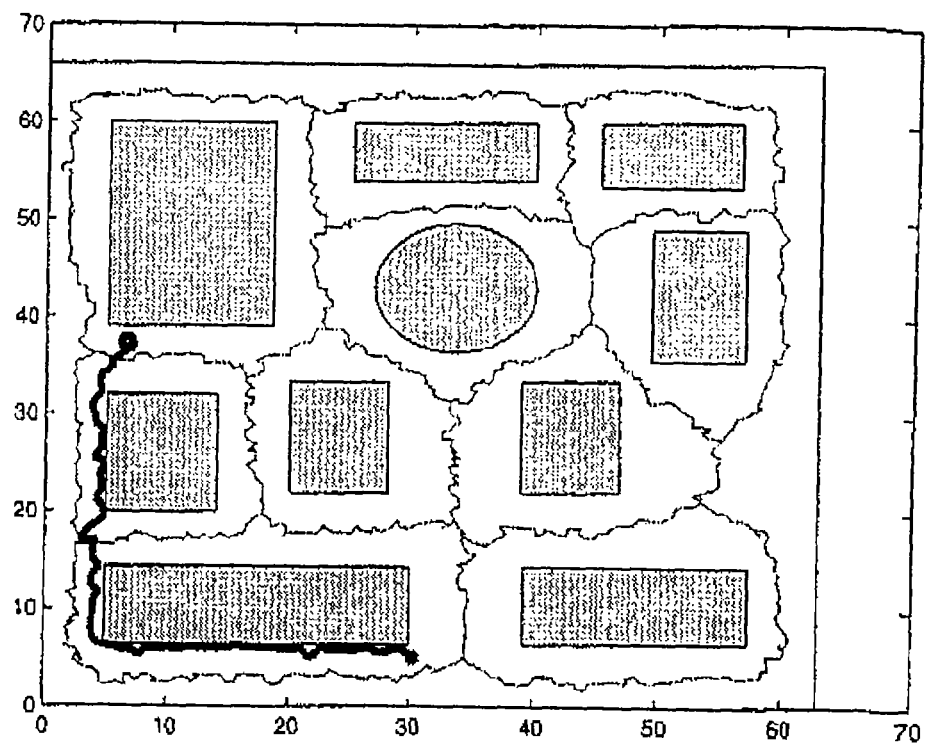
Figure 19C:
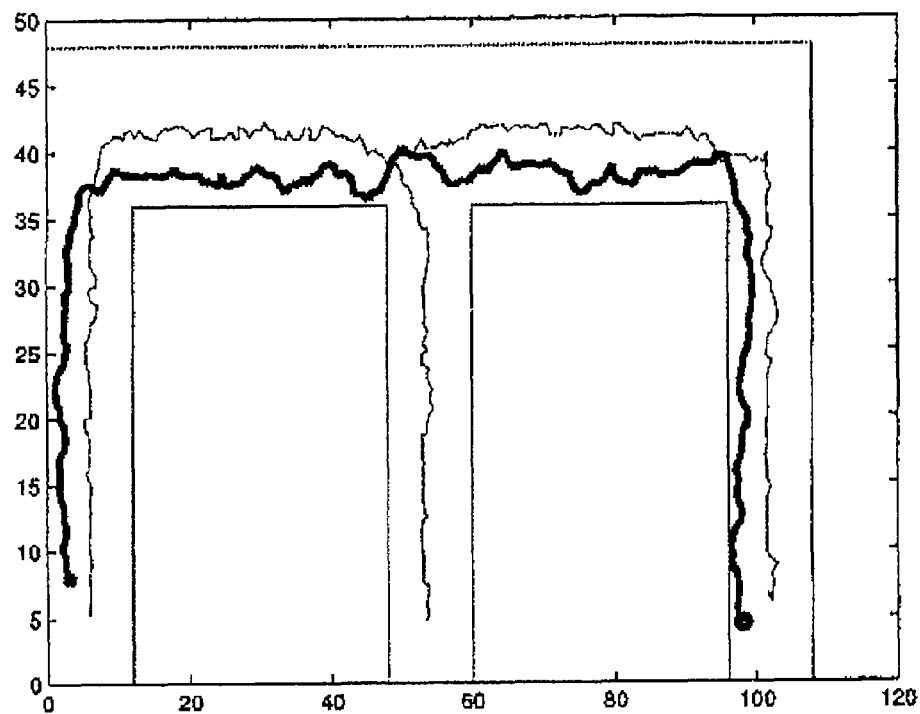
Figure 19D:
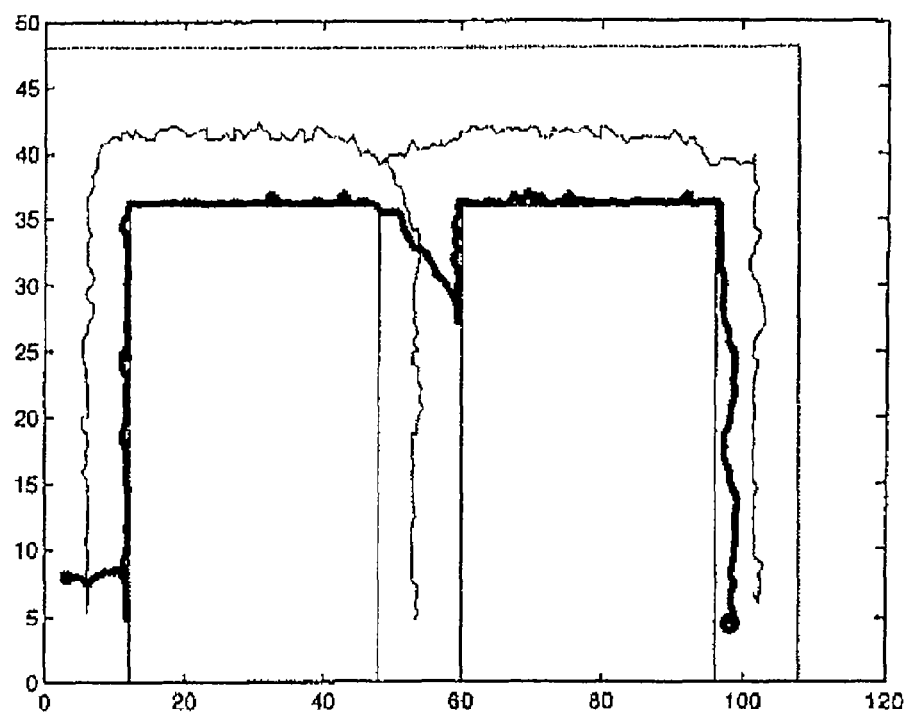

We have found that the MAP technique generates routing paths of comparable lengths both in the number of hops and in the total Euclidean distances, as shown in Table 1. However, the MAP technique achieves much better load balancing. In sensor networks, load balancing is a very important issue. Overloading a particular sensor node will drain out its battery. Sharing of a common media by many parties increases the possibility of conflict and delay of all parties using the link. We compared load balancing of MAP with GPSR. For the same family of source/destination pairs, we drew for each sensor v a bar with height equal to the total number of routing paths through v. FIG. 18 shows a comparison of load balancing of MAP and GPSR. In particular, FIG. 18(a) shows a histogram of loads by MAP on each node; FIG. 18(b) shows a histogram of loads by GPSR on each node. FIG. 18(a) and FIG. 18(b) show the histograms for MAP and GPSR respectively. It can be seen easily that the routing paths generated by GPSR concentrate heavily on the boundaries of holes, while sensors are more uniformly loaded by MAP. The reason is that geographical location-based routing schemes route greedily towards the destination based on Euclidean coordinates. As a result, routing paths tend to follow straight lines and can easily hit boundaries. When that happens, packets follow the boundary by "right-hand rule" until greedy routing can be resumed. Such an operation heavily overloads nodes near boundaries. In contrast, the MAP technique captures the geometry of the environment and performs routing in parallel with the reference paths on the medial axis, thus it avoids the creation of heavily loaded area. FIG. 19 shows a couple of scenarios of the routing paths produced by MAP and GPSR.

FIG. 19 shows a comparison of routing paths generated by MAP and GPSR between the same pair of nodes. Solid circle represents the source and hollow circle represents the destination. FIG. 19(a) shows a path generated by MAP; FIG. 19(b) shows a path generated by GPSR; FIG. 19(c) shows a path generated by MAP; and FIG. 19(d) shows a path generated by GPSR.

We also consider the influence of load balancing on routing. To qualitatively measure the impact of load balancing on routing, we add a weight to each link defined as the frequency at which the link is utilized. This captures the optimal waiting time for link usage in a heavy traffic. In practice, more complicated formulas can be adopted depending on the specific scenario. The bottom part of Table 1 shows the same measures under the weighted metric. We can see from the data that when load balancing is not taken into account, the routing performance of MAP is approximately the same as that of GPSR. However, when load balancing is considered, the performance of MAP becomes significantly better.

5.2 Robustness to Network Model

A common model for wireless sensor networks is the unit disk graph model, where each node has a fixed communication radius. Two nodes can directly communicate if and only if they are within the communication radius. However, the unit disk graph model is a very simplified model and is often far from practice. The existence of communication links can significantly deviate from the unit distance constraint due to reasons such as multi-path fading. It is often observed that sensor nodes within a short communication range may not be able to communicate, while nodes with three or more times the distance can have stable links. A routing scheme that heavily depends on the properties of unit disk graphs is thus not practical in reality. Our MAP naming and routing scheme takes only the connectivity graph as input. We show by simulation that it's very robust to variations in network model.

The robustness of the MAP technique has been tested by using the Quasi-unit disk graph model. See, for example, F. Kuhn and A. Zollinger, in *Proc.* 2003 *joint workshop on Foundations of mobile computing*, pages 69-78 (2003). The Quasi-UDG model is characterized by a simple parameter $\alpha$. When two nodes are within a distance $1-\alpha$, there is a link between them with probability 1. If two node are of a distance more than $1+\alpha$ away from each other, then there is a link between them with probability 0. If the distance of two nodes is between $1-\alpha$ and $1+\alpha$, then a link between them exists with probability p. In order for the nodes to have roughly the same average number of one hop neighbors, we choose $p=(2-\alpha)/4$.

TABLE 2

| | routing on campus | | | |
|---|---|---|---|---|
| | ratio of total hops | ratio of weighted total hops | ratio of total lengths | ratio of weighted total lengths |
| $\alpha = 0.2$ | 1.1364 | 0.5912 | 1.2396 | 0.6578 |
| $\alpha = 0.4$ | 1.0518 | 0.3410 | 1.3170 | 0.4253 |
| $\alpha = 0.6$ | 0.9311 | 0.2885 | 1.3565 | 0.3914 |
| $\alpha = 0.8$ | 0.8799 | 0.2337 | 1.3755 | 0.3684 |

Table 2 shows the performance of the MAP technique on sensor networks in a campus scenario under different graph models. Each result was averaged over fifty experiments. In each experiment we took 12000 source and destination pairs uniformly randomly.

Figure 20:
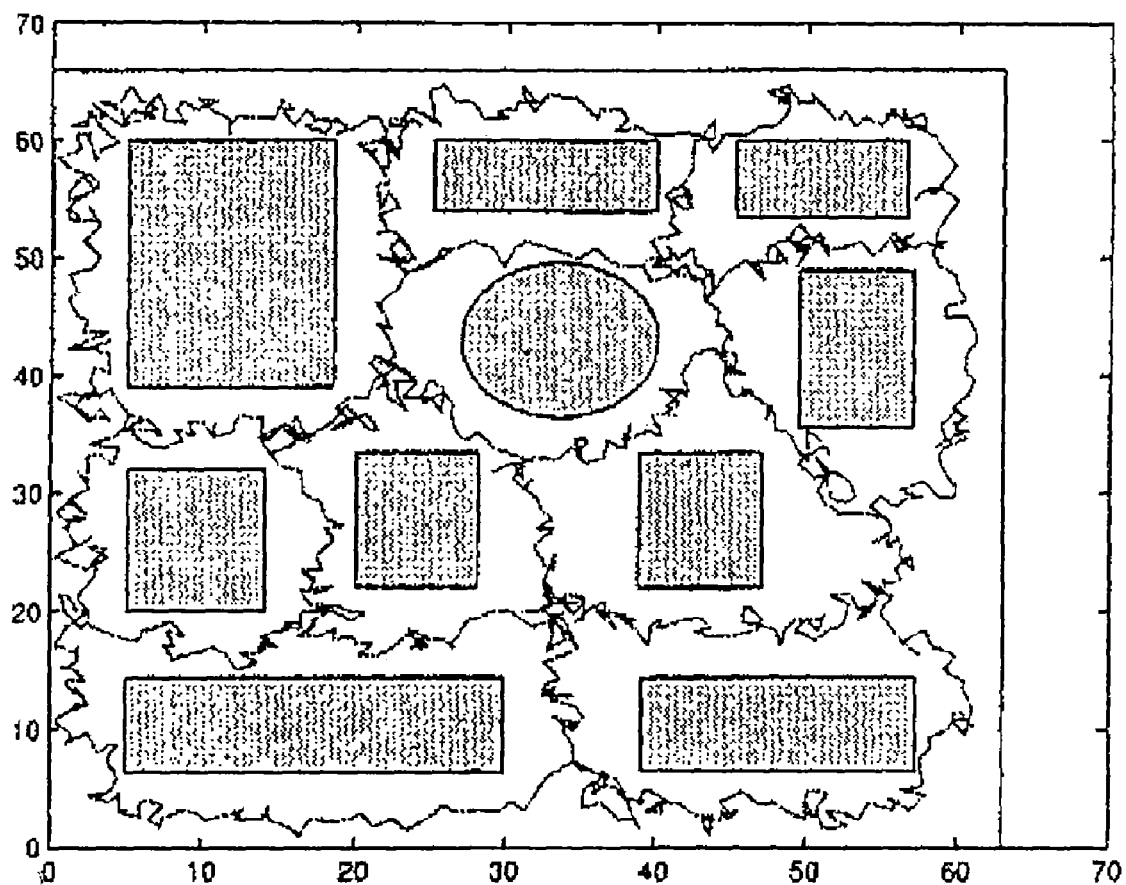
FIG. 20 illustrates exemplary processing of communication devices in the FIG. 1 system for the campus scenario.

We have found that the MAP technique maintains stable performances on both the construction of medial axis and routing. When $\alpha$ is large, a quasi-UDG looks very different from a UDG at local neighborhood level. But the medial axis still captures the correct topology. This can be seen from FIG. 20, which shows the medial axis on a Quasi-UDG with $\alpha=0.8$ in the university campus scenario.

We also compared the routing performance under UDG and Quasi-UDG model on The same university campus scenario. We compared the routing results with 5500 sensors under Quasi-UDG and UDG model (the second line in Table 1). Although the routing graphs cannot be the same in the two experiments, they are both approximating the same underlying geometric domain. Note that in the Quasi-UDG model, the communication ranges of nodes are still small compared to obstacle sizes. From Table 2, we can see that the performance of routing is very stable. However, it is very surprising to see that MAP under Quasi-UDG model achieves better load balancing. This can be shown by the ratio of weighted distances in Table 2 . One explanation is that a Quasi-UDG is more likely to have long links, which will help on local greedy forwarding in MAP.

6 Discussions 6.1 Routing on Manifolds

In this paper we've focused on the topic of routing in sensor networks deployed in an Euclidean space with complex shapes. The MAP naming and routing scheme can be easily extended to routing in other geometric spaces. A particularly interesting case is routing on a 2-dimensional manifold embedded in a 3-dimensional space. One can define the medial axis of the manifold under the geodesic distance metric. The medial axis under geodesic distance metric is a collection of continuous curves lying on the manifold such that any point can be given a name with respect to the medial axis in the same way as what the MAP scheme does. For a dense samples of nodes on such a manifold, the length of the shortest path between two nodes is a reasonably good approximation of their geodesic distance. See, for example, M. Bernstein et al., Graph approximations to geodesics on embedded manifolds, *Technical report*, Department of Psychology, Stanford University (2000). Since we use the shortest path distance metric in the design of MAP, it should be straightforward to extend the MAP naming and routing protocol to nodes on a manifold. One such case is a sensor field deployed on an irregular terrain.

6.2 Geometric Maps

One merit of the MAP technique is that it requires no knowledge about the geographical locations of the nodes or the shape of the sensor field. In some cases, such as airport terminals or warehouses, the map of the sensor field is available and the construction of the medial axis can be simplified. When the geometric shape R of a sensor field is known, we can first construct the medial axis A of the boundary $\partial R$. This can be obtained by using standard techniques such as the crust algorithm. See, for example, N. Amenta et al., *Graphical Models and Image Processing*, 60:125-135 (1998). Sensors near the geometric medial axis A can be marked by an examination of their proximity with A. The remaining part of MAP is the same.

6.3 Global Load Balancing

We've shown by simulation that the MAP routing protocol achieves very good load balancing. One reason is that on the lower level we route in parallel with the medial axis such that routes starting from different sources smoothly "flow through". Load balancing can be further improved on the abstract level. In the global planning stage, a routing path is selected by the shortest path routing algorithm on the medial axis graph (MAG). For a case where the sensor field has many "corridors" with different widths, it is more desirable to route through a wide corridor than a narrow corridor. Therefore, we can attach a weight to each medial node which equals the maximum height (before normalization) of its shortest path tree. An edge on the medial axis graph has a total weight as the sum of weights of the medial nodes on the corresponding medial path. The weight of an edge can be understood as its "capacity". In this way the globally planned routing path takes into account the capacity of different edges such that the medial edge corresponding to a wide corridor is more preferable than the medial edge corresponding to a narrow one with the same length.

7 Conclusion

In this paper we presented MAP, a medial axis based geometric naming and routing protocol for sensor networks. The MAP scheme uses the medial axis as a compact and expressive abstraction of the major geometric and topological features of the underlying field. The effectiveness of such an abstraction explains the efficiency, practicality and generality of the MAP naming and routing algorithms, which have been validated by both analysis and experiments.

Having fully described several embodiments of the present invention, other equivalent or alternative methods of practicing the present invention will be apparent to those skilled in the art. These and other embodiments as well as alternatives and equivalents to the described system will be recognizable to those of skill in the art after reading the description herein. The scope of the invention should not, therefore, be determined solely by reference to the above description, but instead should be determined with reference to the appended claims along with their full scope of equivalents and alternatives.

We claim:

1. A method of routing in a wireless network of communication devices within a network boundary from a first communication device that defines a first network node to a second communication device that defines a second network node, the method performed by at least one of the first communication device or the second communication device comprising:
   (A) constructing a geometric indicator of network connectivity for the wireless network such that the geometric indicator of network connectivity identifies a curve on which network nodes are located;
   (B) determining a network location for each node of the wireless network, wherein the network location of a node p identifies a node on the geometric indicator curve that is closest to the node p, identifies a node on the network boundary that is closest to the node p, and indicates connectivity from the node p to the closest node of the geometric indicator curve;
   (C) determining a routing scheme from the first communication device to the second communication device based on the respective determined network locations for the first and second communication devices;
   wherein constructing the geometric indicator of network connectivity comprises constructing a medial axis representation of the network nodes that includes the set of nodes with at least two closest nodes on the network boundary, and
   wherein determining the network location for each node of the wireless network comprises:
   defining a network name for each node of the wireless network, wherein the network name of a node p is given by (x(p), d(p)) wherein x(p) refers to a node on the medial axis closest to the node p and d(p) comprises connectivity hop count data for the distance from the node p to the node at x(p).

2. The method as defined in claim 1, wherein constructing the medial axis representation of the network nodes comprises:
   (1) identifying nodes on the network boundary of the wireless network;
   (2) determining medial axis nodes of the wireless network; and
   (3) generating a medial axis graph (MAG) that includes all medial nodes of the wireless network.

3. The method as defined in claim 2, wherein determining the medial axis nodes comprises:
   (a) identifying medial nodes of the wireless network;
   (b) storing data for a representation of the medial axis at each communication device identified as a medial node of the wireless network.

4. The method as defined in claim 2, wherein generating the medial axis graph (MAG) comprises:
   (a) determining MAG vertices;
   (b) connecting the MAG vertices along medial edges.

5. The method as defined in claim 1, wherein determining the network location for each node of the network further comprises: calculating circular coordinates for the node p.

6. The method as defined in claim 1, wherein x(p) specifies a range that is determined according to child nodes of a parent naming node.

7. The method as defined in claim 1, wherein the network name for each node p further includes y(p), wherein y(p) is a node on the network boundary that is closest to node p.

8. The method as defined in claim 1, wherein determining the routing scheme from the first communication device to the second communication device comprises:
   (1) determining a medial path S from the first communication device at a node p to the second communication device at a node q, wherein S is given by S(x(p), x(q));
   (2) determining a routing path that is parallel to the medial path S from the communication device at the node p to a communication device at a point t going from circular coordinate cell to circular coordinate cell where t has the medial point x(q); and
   (3) following chords or curves of x(q) from node t to node q.

9. A method of routing in a wireless network of communication devices within a network boundary from a first communication device that defines a first network node to a second communication device that defines a second network node, the method performed by at least one of the first communication device or the second communication device comprising:
   (A) constructing a geometric indicator of network connectivity for the wireless network such that the geometric indicator of network connectivity identifies a curve on which network nodes are located;
   (B) determining a network location for each node of the wireless network, wherein the network location of a node p identifies a node on the geometric indicator curve that is closest to the node p, identifies a node on the network boundary that is closest to the node p, and indicates connectivity from the node p to the closest node of the geometric indicator curve;
   (C) determining a routing scheme from the first communication device to the second communication device based on the respective determined network locations for the first and second communication devices;
   wherein constructing the geometric indicator of network connectivity comprises constructing a medial axis representation of the network nodes;
   wherein constructing a medial axis representation of the network nodes comprises:
   (1) identifying nodes on the network boundary of the wireless network;
   (2) determining medial axis nodes of the wireless network; and
   (3) generating a medial axis graph (MAG) that includes all medial nodes of the wireless network;
   wherein determining the medial axis nodes comprises:
   (a) identifying medial nodes of the wireless network; (b) storing data for a representation of the medial axis at each communication device identified as a medial node of the wireless network;
   wherein identifying medial nodes of the wireless network comprises:
   (i) sending network messages from boundary nodes on the boundary of the wireless network for flooding;
   (ii) determining that a node is a medial node if it has approximately equal hop counts to two nodes on the boundary.

10. A method of routing in a wireless network of communication devices within a network boundary, the method comprising:
   receiving a network message at a current communication device of the wireless network, the current communication device comprising a current node of the wireless network, wherein the network message specifies a source communication device from which the network message originated and specifies a destination communication device to which the network message is intended for delivery, and wherein each communication device is associated with a corresponding network node name;

selecting a next node to which the network message will be sent, wherein the next node is a member of a set of neighbor nodes comprising network nodes that are neighbors of the current node, and the next node is selected in accordance with corresponding network node names of the neighbor nodes and the source node name, destination node name, and current node name, wherein the respective network node names are determined by a respective naming operation performed at each communication device such that each node name indicates (1) the name of a node on a geometric abstraction curve that indicates network connectivity of the wireless network and is closest to the current node such that the geometric abstraction curve comprises a medial axis representation of the network nodes that includes the set of nodes with at least two closest nodes on the network boundary and (2) the hop count from the current node to the closest node on the geometric abstraction curve, wherein the geometric abstraction curve comprises a medial axis graph such that the network name of a node p is specified by (x(p), d(p)) wherein x(p) is the network node name of a node on the medial axis closest to the node p and d(p) comprises connectivity hop count data for the network from node p to the node at x(p).

11. The method as defined in claim 10, wherein selecting the next node comprises determining routing such that the next node is parallel to the medial axis graph along the range from the current node toward the destination node, and if the current node has the same medial node as the destination node, then selecting the next node such that chords of the wireless network are followed from the current node to the destination node.

12. A communication device comprising:
a network communication interface that enables communication of the communication device with other wireless devices;
a central processor that controls operations of the communication device such that the communication device communicates with a plurality of other communication devices, thereby comprising a wireless network of multiple communication devices within a network boundary, such that data from the communication device is routed over the wireless network from the communication device, which defines a first network node, to another communication device, which defines a second network node, wherein the central processor performs a method comprising:
(A) constructing a geometric indicator of network connectivity for the wireless network such that the geometric indicator of network connectivity identifies a curve on which network nodes are located;
(B) determining a network location for the communication device at the first node of the wireless network, wherein the network location of the first node identifies a node on the geometric indicator curve that is closest to the first node, identifies a node on the network boundary that is closest to the first node, and indicates connectivity from the first node to the closest node of the geometric indicator curve; and
(C) determining a routing scheme from the first communication device to the second communication device based on the respective determined network locations for the first node and the second node;
wherein constructing the geometric indicator of network connectivity comprises constructing a medial axis representation of the network nodes that includes the set of nodes with at least two closest nodes on the network boundary and
wherein determining the network location for the communication device ar the first node of the wireless network comprises:
defining a network name for each node of the wireless network, wherein the network name of a node p is given by (x(p), d(p)) wherein x(p) refers to a node on the medial axis closest to the node p and d(p) comprises connectivity hop count data for the distance from the node p to the node at x(p).

13. The communication device as defined in claim 12, wherein the central processor constructs the geometric indicator of network topology by constructing the medial axis representation of the network nodes by performing operations comprising:
(1) identifying nodes on the network boundary of the wireless network;
(2) determining medial axis nodes of the wireless network; and
(3) generating a medial axis graph (MAG) that includes all medial nodes of the wireless network.

14. The communication device as defined in claim 13, wherein determining the medial axis nodes comprises:
(a) identifying medial nodes of the wireless network;
(b) storing data for a representation of the medial axis at each communication device identified as a medial node of the wireless network.

15. The communication device as defined in claim 13, wherein generating the medial axis graph (MAG) comprises:
(a) determining MAG vertices;
(b) connecting the MAG vertices along medial edges;
(c) storing the MAG in every network node.

16. The communication device as defined in claim 12, wherein determining a network location for each node of the network further comprises calculating circular coordinates for the node p.

17. The communication device as defined in claim 12, wherein x(p) specifies a range that is determined according to child nodes of a parent naming node.

18. The communication device as defined in claim 12, wherein the network name for each node p further includes y(p), wherein y(p) is a node on the network boundary that is closest to node p.

19. The communication device as defined in claim 12, wherein the central processor determines a routing scheme from the first communication device to the second communication device by:
(1) determining a medial path S from the first communication device at a node p to the second communication device at a node q, wherein S is given by S(x(p), x(q));
(2) determining a routing path that is parallel to the medial path S from the communication device at the node p to a communication device at a point t going from network cell to network cell until the path reaches a network cell where t has the medial point x(q); and
(3) following chords or curves of x(q) from node t to node q.

20. A communication device comprising:
a network communication interface that enables communication of the communication device with other wireless devices;
a central processor that controls operations of the communication device such that the communication device communicates with a plurality of other communication devices, thereby comprising a wireless network of multiple communication devices within a network boundary, such that data from the communication device is routed over the wireless network from the communication device, which defines a first network node, to another communication device, which defines a second network node, wherein the central processor performs a method comprising:
 (A) constructing a geometric indicator of network connectivity for the wireless network such that the geometric indicator of network connectivity identifies a curve on which network nodes are located;
 (B) determining a network location for the communication device at the first node of the wireless network, wherein the network location of the first node identifies a node on the geometric indicator curve that is closest to the first node, identifies a node on the network boundary that is closest to the first node, and indicates connectivity from the first node to the closest node of the geometric indicator curve; and
 (C) determining a routing scheme from the first communication device to the second communication device based on the respective determined network locations for the first node and the second node;
wherein the central processor constructs the geometric indicator of network topology by constructing a medial axis representation of the network nodes by performing operations comprising:
 (1) identifying nodes on the network boundary of the wireless network;
 (2) determining medial axis nodes of the wireless network; and
 (3) generating a medial axis graph (MAG) that includes all medial nodes of the wireless network;
wherein determining the medial axis nodes comprises:
 (a) identifying medial nodes of the wireless network;
 (b) storing data for a representation of the medial axis at each communication device identified as a medial node of the wireless network;
wherein identifying medial nodes of the wireless network comprises:
 (i) sending network messages from nodes on the boundary for flooding;
 (ii) determining that a node is a medial node if it has approximately equal hop counts to two nodes on the boundary.

21. A communication device comprising:
a network communication interface that enables communication of the communication device with other wireless devices;
a central processor that controls operations of the communication device such that the communication device communicates with a plurality of other communication devices, thereby comprising a wireless network of multiple communication devices within a network boundary, such that data from the communication device is routed over the wireless network from the communication device, which defines a first network node, to another communication device, which defines a second network node, wherein the central processor performs a method comprising:
receiving a network message at a current communication device of the wireless network, the current communication device comprising a current node of the wireless network, wherein the network message specifies a source communication device from which the network message originated and specifies a destination communication device to which the network message is intended for delivery, and wherein each communication device is associated with a corresponding network node name; and
selecting a next node to which the network message will be sent, wherein the next node is a member of a set of neighbor nodes comprising network nodes that are neighbors of the current node, and the next node is selected in accordance with corresponding network node names of the neighbor nodes and the source node name, destination node name, and current node name, wherein the respective network node names are determined by a respective naming operation performed at each communication device such that each node name indicates (1) the name of a node on a geometric abstraction curve that indicates network connectivity of the wireless network and is closest to the current node such that the geometric abstraction curve comprises a medial axis representation of the network nodes that includes the set of nodes with at least two closest nodes on the network boundary and (2) the hop count from the current node to the closest node on the geometric abstraction curve;
wherein the geometric abstraction curve comprises a medial axis graph such that the network name of a node p is specified by (x(p), d(p)), wherein x(p) is the network node name of a node on the medial axis closest to the node p and x(p) specifies a range that is determined according to child nodes of a parent naming node, and d(p) comprises connectivity hop count data for the network from the node p to the node at x(p); and
wherein selecting a next node comprises determining routing such that the next node is parallel to the medial axis graph along the range from the current node toward the destination node, and if the current node has the same medial node as the destination node, then selecting the next node such that chords of the wireless network are followed from the current node to the destination node.

* * * * *